(12) United States Patent
Cheng et al.

(10) Patent No.: US 10,554,321 B2
(45) Date of Patent: Feb. 4, 2020

(54) INFORMATION COMMUNICATION METHOD, USER EQUIPMENT, AND NETWORK DEVICE

(71) Applicant: Huawei Technologies Co., Ltd., Shenzhen (CN)

(72) Inventors: Yan Cheng, Beijing (CN); Hao Sun, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 16/146,602

(22) Filed: Sep. 28, 2018

(65) Prior Publication Data

US 2019/0036634 A1 Jan. 31, 2019

Related U.S. Application Data

(63) Continuation of application No. PCT/CN2017/076619, filed on Mar. 14, 2017.

(30) Foreign Application Priority Data

Mar. 31, 2016 (CN) .......................... 2016 1 0201016

(51) Int. Cl.
*H04W 4/00* (2018.01)
*H04J 11/00* (2006.01)
*H04W 48/16* (2009.01)

(52) U.S. Cl.
CPC ......... *H04J 11/0069* (2013.01); *H04W 48/16* (2013.01)

(58) Field of Classification Search
CPC ... H04J 11/0069; H04W 48/16; H04W 48/12; H04L 27/2602; H04L 27/2666
(Continued)

(56) References Cited

U.S. PATENT DOCUMENTS 9,078,246 B2 7/2015 Kim et al.
9,137,075 B2 9/2015 Lindoff et al.
(Continued)

FOREIGN PATENT DOCUMENTS

CN 101282160 A 10/2008
CN 102299892 A 12/2011
(Continued)

OTHER PUBLICATIONS

Ericsson, "NB-IoT—Indication of deployment mode," 3GPP TSG-RAN WG1 Meeting #84, R1-160268, Feb. 15-19, 2016, St. Julian, Malta, 4 pages.
(Continued)

*Primary Examiner* — Marcos Batista
(74) *Attorney, Agent, or Firm* — Slater Matsil, LLP

(57) ABSTRACT

A method for wireless communication includes: determining the subcarrier spacing corresponding to synchronization signal based on the correspondence of frequency set of the serving cell and the at least one subcarrier spacing; receiving synchronization signal and MIB of the serving cell, wherein the master information block comprising subcarrier spacing indication information; determining a system parameter of the serving cell based on the subcarrier spacing of the serving cell indicated by the subcarrier spacing indication information; and perform information transmission or reception with network device using the system parameter.

20 Claims, 5 Drawing Sheets

UE determines a carrier frequency of a serving cell — S301

The UE determines, based on the carrier frequency of the serving cell, a subcarrier spacing set corresponding to the serving cell — S302

The UE determines a subcarrier spacing of the serving cell based on the subcarrier spacing set corresponding to the serving cell — S303

(58) Field of Classification Search
USPC .......................................... 455/434; 370/338
See application file for complete search history.

(56) References Cited

U.S. PATENT DOCUMENTS

| | | |
|---|---|---|
| 2011/0142151 A1 | 6/2011 | Zhang et al. |
| 2012/0263130 A1* | 10/2012 | Ishikura .................. H04L 5/001 370/329 |
| 2013/0028204 A1 | 1/2013 | Dinan |
| 2017/0094547 A1* | 3/2017 | Yum ...................... H04W 72/04 |
| 2018/0007673 A1* | 1/2018 | Fwu ........................ H04W 4/70 |
| 2018/0359790 A1* | 12/2018 | Ingale ...................... H04W 8/24 |
| 2019/0059075 A1 | 2/2019 | Hayashi et al. |

FOREIGN PATENT DOCUMENTS

| | | |
|---|---|---|
| EP | 2573965 A1 | 3/2013 |
| JP | 2019057745 A | 4/2019 |
| KR | 20090113893 A | 11/2009 |
| WO | 2008101762 A1 | 8/2008 |
| WO | 2016040290 A1 | 3/2016 |

OTHER PUBLICATIONS

Wi Rapporteur (Ericsson), "RAN1 agreements for Rel-13 NB-IoT," 3GPP TSG-RAN WG1 Meeting #84, R1-161548, Feb. 15-19, 2016, St. Julian's, Malta, 11 pages.

* cited by examiner

```
┌─────────────────────────────────────────────────┐
│ A network device determines, based on a subcarrier spacing set │
│ corresponding to a serving cell, a subcarrier spacing corresponding to │
│ a synchronization signal of the serving cell and a subcarrier spacing │
│ corresponding to a broadcast channel of the serving cell │
└─────────────────────────────────────────────────┘  S801
                          │
                          ▼
┌─────────────────────────────────────────────────┐
│ The network device sends the synchronization signal of the serving │
│ cell in the serving cell based on the subcarrier spacing corresponding │
│ to the synchronization signal of the serving cell, and sends the │
│ broadcast channel of the serving cell in the serving cell based on the │
│ subcarrier spacing corresponding to the broadcast channel of the │
│ serving cell, where a master information block of the serving cell │
│ carried on the broadcast channel includes subcarrier spacing │
│ indication information, and the subcarrier spacing indication │
│ information is used to indicate a subcarrier spacing of the serving cell │
│ to UE │
└─────────────────────────────────────────────────┘  S802
```

FIG. 8

```
┌─────────────────────────────────────────────────┐
│ A network device determines a subcarrier spacing corresponding to │
│ a synchronization signal of a serving cell and a subcarrier spacing │
│ corresponding to a broadcast channel of the serving cell │
└─────────────────────────────────────────────────┘  S901
                          │
                          ▼
┌─────────────────────────────────────────────────┐
│ The network device sends the synchronization signal of the serving │
│ cell in the serving cell based on the subcarrier spacing │
│ corresponding to the synchronization signal of the serving cell, and │
│ sends the broadcast channel of the serving cell in the serving cell │
│ based on the subcarrier spacing corresponding to the broadcast │
│ channel of the serving cell, where a master information block of │
│ the serving cell carried on the broadcast channel includes │
│ subcarrier spacing indication information, and the subcarrier │
│ spacing indication information is used to indicate a subcarrier │
│ spacing of the serving cell to UE │
└─────────────────────────────────────────────────┘  S902
```

FIG. 9

INFORMATION COMMUNICATION METHOD, USER EQUIPMENT, AND NETWORK DEVICE

CROSS-REFERENCE TO RELATED APPLICATIONS

This application is a continuation of International Application No. PCT/CN2017/076619, filed on Mar. 14, 2017, which claims priority to Chinese Patent Application No. 201610201016.8, filed on Mar. 31, 2016, both of which are hereby incorporated by reference in their entireties.

TECHNICAL FIELD

This application relates to communications technologies, and in particular, to an information communication method, user equipment, and a network device.

BACKGROUND

A 5G communications system may support different services, different deployment scenarios, and different spectrums. The foregoing service may be, for example, an enhanced mobile broadband (eMBB) service, a machine type communication (MTC) service, an ultra-reliable and low latency communications (URLLC) service, a multimedia broadcast multicast service (MBMS), or a positioning service. The foregoing deployment scenario may be, for example, an indoor hotspot scenario, a dense urban scenario, a suburban scenario, an urban macro coverage scenario, or a high-speed railway scenario. The foregoing spectrum may be, for example, any frequency range within 100 GHz.

A serving cell of a network device in the 5G communications system may support a plurality of sets of system parameters, so that the serving cell may use different system parameters (numerology) in the different services, the different deployment scenarios, and the different spectrums. Each set of system parameters may include a subframe length, a quantity of symbols included in a subframe, a cyclic prefix length, and the like.

However, how to determine a system parameter used by the serving cell is a technical problem that needs to be resolved urgently.

SUMMARY

This application provides an information communication method, user equipment, and a network device, so as to resolve a technical problem in the prior art of how to determine a system parameter used by a serving cell.

According to a first aspect, this application provides an information communication method, and the method may include: determining, by user equipment UE, a subcarrier spacing of a serving cell; determining, by the UE, a system parameter of the serving cell based on the subcarrier spacing of the serving cell; and sending, by the UE, information to a network device in the serving cell based on the system parameter of the serving cell, or receiving, in the serving cell based on the system parameter of the serving cell, information from the network device.

Based on the information communication method provided in the first aspect, when the serving cell uses different system parameters in different services, different deployment scenarios, and different spectrums, the UE may determine, by using a subcarrier spacing currently used by the serving cell, a system parameter currently used by the serving cell, so that the UE may perform information communication with the network device in the serving cell by using the system parameter, thereby improving information communication efficiency.

Optionally, in a possible implementation of the first aspect, the determining, by user equipment UE, a subcarrier spacing of a serving cell includes: determining, by the UE, a frequency set corresponding to the serving cell; determining, by the UE based on the frequency set corresponding to the serving cell, a subcarrier spacing set corresponding to the serving cell; and determining, by the UE, the subcarrier spacing of the serving cell based on the subcarrier spacing set corresponding to the serving cell.

Optionally, in a possible implementation of the first aspect, the determining, by user equipment UE, a subcarrier spacing of a serving cell includes: determining, by the UE, a carrier frequency of the serving cell; determining, by the UE based on the carrier frequency of the serving cell, a subcarrier spacing set corresponding to the serving cell; and determining, by the UE, the subcarrier spacing of the serving cell based on the subcarrier spacing set corresponding to the serving cell.

Based on the information communication method provided in the foregoing two possible implementations, one serving cell may correspond to one subcarrier spacing set, so that the serving cell may use different subcarrier spacings in the subcarrier spacing set in different scenarios, thereby improving performance of a communications system by using a subcarrier spacing better matching a scenario.

Further, in a possible implementation of the first aspect, the determining, by the UE based on the carrier frequency of the serving cell, a subcarrier spacing set corresponding to the serving cell includes: when the carrier frequency of the serving cell is less than or equal to 6 GHz, determining, by the UE, that the subcarrier spacing set corresponding to the serving cell includes a subcarrier spacing 15 kHz and a subcarrier spacing 30 kHz; or when the carrier frequency of the serving cell is greater than 6 GHz and less than or equal to 30 GHz, determining, by the UE, that the subcarrier spacing set corresponding to the serving cell includes a subcarrier spacing 30 kHz and a subcarrier spacing 60 kHz; or when the carrier frequency of the serving cell is greater than 30 GHz and less than or equal to 100 GHz, determining, by the UE, that the subcarrier spacing set corresponding to the serving cell includes a subcarrier spacing 120 kHz and a subcarrier spacing 240 kHz.

Further, in a possible implementation of the first aspect, the determining, by the UE based on the carrier frequency of the serving cell, a subcarrier spacing set corresponding to the serving cell includes: when the carrier frequency of the serving cell is less than or equal to 3 GHz, determining, by the UE, that the subcarrier spacing set corresponding to the serving cell includes a subcarrier spacing 15 kHz and a subcarrier spacing 17.5 kHz; or when the carrier frequency of the serving cell is greater than 3 GHz and less than or equal to 6 GHz, determining, by the UE, that the subcarrier spacing set corresponding to the serving cell includes a subcarrier spacing 17.5 kHz and a subcarrier spacing 35 kHz; or when the carrier frequency of the serving cell is greater than 6 GHz and less than or equal to 30 GHz, determining, by the UE, that the subcarrier spacing set corresponding to the serving cell includes a subcarrier spacing 35 kHz and a subcarrier spacing 70 kHz; or when the carrier frequency of the serving cell is greater than 30 GHz and less than or equal to 100 GHz, determining, by the UE, that the subcarrier spacing set corresponding to the serving cell includes a subcarrier spacing 140 kHz and a subcarrier spacing 280 kHz.

Based on the information communication method provided in the foregoing two possible implementations, each subcarrier spacing in each subcarrier spacing set can relatively well match a spectrum, thereby ensuring performance of a communications system, and reducing a quantity of subcarrier spacings in each subcarrier spacing set to a full extent.

Further, in a possible implementation of the first aspect, the determining, by the UE, the subcarrier spacing of the serving cell based on the subcarrier spacing set corresponding to the serving cell includes: detecting, by the UE, a synchronization signal of the serving cell based on the subcarrier spacing set corresponding to the serving cell; and determining, by the UE, the subcarrier spacing of the serving cell based on the detected synchronization signal of the serving cell.

Based on the information communication method provided in the foregoing possible implementation, when a quantity of subcarriers spacings in a subcarrier spacing set corresponding to the serving cell is less than or equal to 2, a quantity of times of blindly detecting the synchronization signal of the serving cell by the UE can be reduced, a success rate of detecting the synchronization signal of the serving cell by the UE can be increased, and duration in which the UE detects the synchronization signal of the serving cell can be shortened. To be specific, duration in which the UE accesses the serving cell is shortened, and a success rate of accessing a cell by the UE is increased, so that a success rate of determining the subcarrier spacing of the serving cell by the UE is increased.

Further, in a possible implementation of the first aspect, the determining, by the UE, the subcarrier spacing of the serving cell based on the subcarrier spacing set corresponding to the serving cell includes: determining, by the UE based on the subcarrier spacing set corresponding to the serving cell, a subcarrier spacing corresponding to a synchronization signal of the serving cell and a subcarrier spacing corresponding to a broadcast channel of the serving cell; detecting, by the UE, the synchronization signal of the serving cell based on the subcarrier spacing corresponding to the synchronization signal of the serving cell, and synchronizing with the serving cell; detecting, by the UE, a master information block of the serving cell based on the subcarrier spacing corresponding to the broadcast channel of the serving cell, where the master information block includes subcarrier spacing indication information, and the subcarrier spacing indication information is used to indicate the subcarrier spacing of the serving cell to the UE; and determining, by the UE, the subcarrier spacing of the serving cell based on the subcarrier spacing indication information.

Based on the information communication method provided in the foregoing possible implementation, the UE can determine the subcarrier spacing of the serving cell without blindly detecting the synchronization signal. Therefore, duration in which the UE detects the synchronization signal is shortened. To be specific, duration in which the UE synchronizes with the serving cell is shortened, duration in which the UE accesses the serving cell is shortened, a success rate of detecting the synchronization signal of the serving cell by the UE is increased, and a success rate of accessing a cell by the UE is increased, so that a success rate of determining the subcarrier spacing of the serving cell by the UE is increased.

Optionally, in a possible implementation of the first aspect, the determining, by user equipment UE, a subcarrier spacing of a serving cell includes: determining, by the UE, a subcarrier spacing corresponding to a synchronization signal of the serving cell and a subcarrier spacing corresponding to a broadcast channel of the serving cell; detecting, by the UE, the synchronization signal of the serving cell based on the subcarrier spacing corresponding to the synchronization signal of the serving cell, and synchronizing with the serving cell; detecting, by the UE, a master information block of the serving cell based on the subcarrier spacing corresponding to the broadcast channel of the serving cell, where the master information block of the serving cell includes subcarrier spacing indication information, and the subcarrier spacing indication information is used to indicate the subcarrier spacing of the serving cell to the UE; and determining, by the UE, the subcarrier spacing of the serving cell based on the subcarrier spacing indication information.

Based on the information communication method provided in the foregoing possible implementation, when the serving cell sends the synchronization signal and the broadcast channel by using a subcarrier spacing adaptive to all serving cells, the UE can determine the subcarrier spacing of the serving cell without blindly detecting the synchronization signal. Therefore, duration in which the UE detects the synchronization signal is shortened. To be specific, duration in which the UE synchronizes with the serving cell is shortened, duration in which the UE accesses the serving cell is shortened, a success rate of detecting the synchronization signal of the serving cell by the UE is increased, and a success rate of accessing a cell by the UE is increased, so that a success rate of determining the subcarrier spacing of the serving cell by the UE is increased.

According to a second aspect, this application provides an information communication method, and the method may include: determining, by a network device, a subcarrier spacing of a serving cell; determining, by the network device, a system parameter of the serving cell based on the subcarrier spacing of the serving cell; and sending, by the network device, information to user equipment UE in the serving cell based on the system parameter of the serving cell, or receiving, in the serving cell based on the system parameter of the serving cell, information from the UE.

Optionally, in a possible implementation of the second aspect, the determining, by a network device, a subcarrier spacing of a serving cell includes: determining, by the network device, a frequency set corresponding to the serving cell; determining, by the network device based on the frequency set corresponding to the serving cell, a subcarrier spacing set corresponding to the serving cell; and determining, by the network device, the subcarrier spacing of the serving cell based on the subcarrier spacing set corresponding to the serving cell.

Optionally, in a possible implementation of the second aspect, the determining, by a network device, a subcarrier spacing of a serving cell includes: determining, by the network device, a carrier frequency of the serving cell; determining, by the network device based on the carrier frequency of the serving cell, a subcarrier spacing set corresponding to the serving cell; and determining, by the network device, the subcarrier spacing of the serving cell based on the subcarrier spacing set corresponding to the serving cell.

Further, in a possible implementation of the second aspect, the determining, by the network device based on the carrier frequency of the serving cell, a subcarrier spacing set corresponding to the serving cell includes: when the carrier frequency of the serving cell is less than or equal to 6 GHz, determining, by the network device, that the subcarrier spacing set corresponding to the serving cell includes a subcarrier spacing 15 kHz and a subcarrier spacing 30 kHz; or when the carrier frequency of the serving cell is greater than 6 GHz and less than or equal to 30 GHz, determining, by the network device, that the subcarrier spacing set corresponding to the serving cell includes a subcarrier spacing 30 kHz and a subcarrier spacing 60 kHz; or when the carrier frequency of the serving cell is greater than 30 GHz and less than or equal to 100 GHz, determining, by the network device, that the subcarrier spacing set corresponding to the serving cell includes a subcarrier spacing 120 kHz and a subcarrier spacing 240 kHz.

Further, in a possible implementation of the second aspect, the determining, by the network device based on the carrier frequency of the serving cell, a subcarrier spacing set corresponding to the serving cell includes: when the carrier frequency of the serving cell is less than or equal to 3 GHz, determining, by the network device, that the subcarrier spacing set corresponding to the serving cell includes a subcarrier spacing 15 kHz and a subcarrier spacing 17.5 kHz; or when the carrier frequency of the serving cell is greater than 3 GHz and less than or equal to 6 GHz, determining, by the network device, that the subcarrier spacing set corresponding to the serving cell includes a subcarrier spacing 17.5 kHz and a subcarrier spacing 35 kHz; or when the carrier frequency of the serving cell is greater than 6 GHz and less than or equal to 30 GHz, determining, by the network device, that the subcarrier spacing set corresponding to the serving cell includes a subcarrier spacing 35 kHz and a subcarrier spacing 70 kHz; or when the carrier frequency of the serving cell is greater than 30 GHz and less than or equal to 100 GHz, determining, by the network device, that the subcarrier spacing set corresponding to the serving cell includes a subcarrier spacing 140 kHz and a subcarrier spacing 280 kHz.

Further, in a possible implementation of the second aspect, the method further includes: determining, by the network device based on the subcarrier spacing set corresponding to the serving cell, a subcarrier spacing corresponding to a synchronization signal of the serving cell and a subcarrier spacing corresponding to a broadcast channel of the serving cell; and sending, by the network device, the synchronization signal of the serving cell in the serving cell based on the subcarrier spacing corresponding to the synchronization signal of the serving cell, and sending the broadcast channel of the serving cell in the serving cell based on the subcarrier spacing corresponding to the broadcast channel of the serving cell, where a master information block of the serving cell carried on the broadcast channel includes subcarrier spacing indication information, and the subcarrier spacing indication information is used to indicate the subcarrier spacing of the serving cell to the UE.

Optionally, in a possible implementation of the second aspect, the method further includes: determining, by the network device, a subcarrier spacing corresponding to a synchronization signal of the serving cell and a subcarrier spacing corresponding to a broadcast channel of the serving cell; and sending, by the network device, the synchronization signal of the serving cell in the serving cell based on the subcarrier spacing corresponding to the synchronization signal of the serving cell, and sending the broadcast channel of the serving cell in the serving cell based on the subcarrier spacing corresponding to the broadcast channel of the serving cell, where a master information block of the serving cell carried on the broadcast channel includes subcarrier spacing indication information, and the subcarrier spacing indication information is used to indicate the subcarrier spacing of the serving cell to the UE.

For beneficial effects of the information communication method provided in the second aspect and all possible implementations of the second aspect, refer to beneficial effects brought by the first aspect and all possible implementations of the first aspect, and details are not described herein again.

According to a third aspect, this application provides user equipment UE, and the UE includes: a processing unit, configured to: determine a subcarrier spacing of a serving cell; and determine a system parameter of the serving cell based on the subcarrier spacing of the serving cell; and a transceiver unit, configured to send information to a network device in the serving cell based on the system parameter of the serving cell determined by the processing unit, or receive, in the serving cell based on the system parameter of the serving cell determined by the processing unit, information from the network device.

Optionally, in a possible implementation of the third aspect, that a processing unit is configured to determine a subcarrier spacing of a serving cell is: the processing unit is configured to: determine a frequency set corresponding to the serving cell; determine, based on the frequency set corresponding to the serving cell, a subcarrier spacing set corresponding to the serving cell; and determine the subcarrier spacing of the serving cell based on the subcarrier spacing set corresponding to the serving cell.

Optionally, in a possible implementation of the third aspect, that a processing unit is configured to determine a subcarrier spacing of a serving cell is: the processing unit is configured to: determine a carrier frequency of the serving cell; determine, based on the carrier frequency of the serving cell, a subcarrier spacing set corresponding to the serving cell; and determine the subcarrier spacing of the serving cell based on the subcarrier spacing set corresponding to the serving cell.

Further, in a possible implementation of the third aspect, that the processing unit is configured to determine, based on the carrier frequency of the serving cell, a subcarrier spacing set corresponding to the serving cell is: the processing unit is configured to: when the carrier frequency of the serving cell is less than or equal to 6 GHz, determine that the subcarrier spacing set corresponding to the serving cell includes a subcarrier spacing 15 kHz and a subcarrier spacing 30 kHz; or when the carrier frequency of the serving cell is greater than 6 GHz and less than or equal to 30 GHz, determine that the subcarrier spacing set corresponding to the serving cell includes a subcarrier spacing 30 kHz and a subcarrier spacing 60 kHz; or when the carrier frequency of the serving cell is greater than 30 GHz and less than or equal to 100 GHz, determine that the subcarrier spacing set corresponding to the serving cell includes a subcarrier spacing 120 kHz and a subcarrier spacing 240 kHz.

Further, in a possible implementation of the third aspect, that the processing unit is configured to determine, based on the carrier frequency of the serving cell, a subcarrier spacing set corresponding to the serving cell is: the processing unit is configured to: when the carrier frequency of the serving cell is less than or equal to 3 GHz, determine that the subcarrier spacing set corresponding to the serving cell includes a subcarrier spacing 15 kHz and a subcarrier spacing 17.5 kHz; or when the carrier frequency of the serving cell is greater than 3 GHz and less than or equal to 6 GHz, determine that the subcarrier spacing set corresponding to the serving cell includes a subcarrier spacing 17.5 kHz and a subcarrier spacing 35 kHz; or when the carrier frequency of the serving cell is greater than 6 GHz and less than or equal to 30 GHz, determine that the subcarrier spacing set corresponding to the serving cell includes a subcarrier spacing 35 kHz and a subcarrier spacing 70 kHz; or when the carrier frequency of the serving cell is greater than 30 GHz and less than or equal to 100 GHz, determine that the subcarrier spacing set corresponding to the serving cell includes a subcarrier spacing 140 kHz and a subcarrier spacing 280 kHz.

Further, in a possible implementation of the third aspect, that the processing unit is configured to determine the subcarrier spacing of the serving cell based on the subcarrier spacing set corresponding to the serving cell is: the processing unit is configured to: detect, by using the transceiver unit, a synchronization signal of the serving cell based on the subcarrier spacing set corresponding to the serving cell; and determine the subcarrier spacing of the serving cell based on the detected synchronization signal of the serving cell.

Further, in a possible implementation of the third aspect, that the processing unit is configured to determine the subcarrier spacing of the serving cell based on the subcarrier spacing set corresponding to the serving cell is: the processing unit is configured to: determine, based on the subcarrier spacing set corresponding to the serving cell, a subcarrier spacing corresponding to a synchronization signal of the serving cell and a subcarrier spacing corresponding to a broadcast channel of the serving cell;

detect, by using the transceiver unit, the synchronization signal of the serving cell based on the subcarrier spacing corresponding to the synchronization signal of the serving cell, and synchronize with the serving cell by using the transceiver unit;

detect, by using the transceiver unit, a master information block of the serving cell based on the subcarrier spacing corresponding to the broadcast channel of the serving cell, where the master information block includes subcarrier spacing indication information, and the subcarrier spacing indication information is used to indicate the subcarrier spacing of the serving cell to the UE; and determine the subcarrier spacing of the serving cell based on the subcarrier spacing indication information.

Optionally, in a possible implementation of the third aspect, that a processing unit is configured to determine a subcarrier spacing of a serving cell is:

the processing unit is configured to: determine a subcarrier spacing corresponding to a synchronization signal of the serving cell and a subcarrier spacing corresponding to a broadcast channel of the serving cell;

detect, by using the transceiver unit, the synchronization signal of the serving cell based on the subcarrier spacing corresponding to the synchronization signal of the serving cell, and synchronize with the serving cell by using the transceiver unit;

detect, by using the transceiver unit, a master information block of the serving cell based on the subcarrier spacing corresponding to the broadcast channel of the serving cell, where the master information block of the serving cell includes subcarrier spacing indication information, and the subcarrier spacing indication information is used to indicate the subcarrier spacing of the serving cell to the UE; and determine the subcarrier spacing of the serving cell based on the subcarrier spacing indication information.

For beneficial effects of the UE provided in the third aspect and all possible implementations of the third aspect, refer to beneficial effects brought by the first aspect and all possible implementations of the first aspect, and details are not described herein again.

According to a fourth aspect, this application provides a network device, and the network device includes:

a processing unit, configured to: determine a subcarrier spacing of a serving cell; and determine a system parameter of the serving cell based on the subcarrier spacing of the serving cell; and a transceiver unit, configured to send information to user equipment UE in the serving cell based on the system parameter of the serving cell determined by the processing unit, or receive, in the serving cell based on the system parameter of the serving cell determined by the processing unit, information from the UE.

Optionally, in a possible implementation of the fourth aspect, that a processing unit is configured to determine a subcarrier spacing of a serving cell is:

the processing unit is configured to: determine a frequency set corresponding to the serving cell; determine, based on the frequency set corresponding to the serving cell, a subcarrier spacing set corresponding to the serving cell; and determine the subcarrier spacing of the serving cell based on the subcarrier spacing set corresponding to the serving cell.

Optionally, in a possible implementation of the fourth aspect, that a processing unit is configured to determine a subcarrier spacing of a serving cell is:

the processing unit is configured to: determine a carrier frequency of the serving cell; determine, based on the carrier frequency of the serving cell, a subcarrier spacing set corresponding to the serving cell; and determine the subcarrier spacing of the serving cell based on the subcarrier spacing set corresponding to the serving cell.

Further, in a possible implementation of the fourth aspect, that the processing unit is configured to determine, based on the carrier frequency of the serving cell, a subcarrier spacing set corresponding to the serving cell is:

the processing unit is configured to: when the carrier frequency of the serving cell is less than or equal to 6 GHz, determine that the subcarrier spacing set corresponding to the serving cell includes a subcarrier spacing 15 kHz and a subcarrier spacing 30 kHz; or when the carrier frequency of the serving cell is greater than 6 GHz and less than or equal to 30 GHz, determine that the subcarrier spacing set corresponding to the serving cell includes a subcarrier spacing 30 kHz and a subcarrier spacing 60 kHz; or when the carrier frequency of the serving cell is greater than 30 GHz and less than or equal to 100 GHz, determine that the subcarrier spacing set corresponding to the serving cell includes a subcarrier spacing 120 kHz and a subcarrier spacing 240 kHz.

Further, in a possible implementation of the fourth aspect, that the processing unit is configured to determine, based on the carrier frequency of the serving cell, a subcarrier spacing set corresponding to the serving cell is:

the processing unit is configured to: when the carrier frequency of the serving cell is less than or equal to 3 GHz, determine that the subcarrier spacing set corresponding to the serving cell includes a subcarrier spacing 15 kHz and a subcarrier spacing 17.5 kHz; or when the carrier frequency of the serving cell is greater than 3 GHz and less than or equal to 6 GHz, determine that the subcarrier spacing set corresponding to the serving cell includes a subcarrier spacing 17.5 kHz and a subcarrier spacing 35 kHz; or when the carrier frequency of the serving cell is greater than 6 GHz and less than or equal to 30 GHz, determine that the subcarrier spacing set corresponding to the serving cell includes a subcarrier spacing 35 kHz and a subcarrier spacing 70 kHz; or when the carrier frequency of the serving cell is greater than 30 GHz and less than or equal to 100 GHz, determine that the subcarrier spacing set corresponding to the serving cell includes a subcarrier spacing 140 kHz and a subcarrier spacing 280 kHz.

Further, in a possible implementation of the fourth aspect, the processing unit is further configured to determine, based on the subcarrier spacing set corresponding to the serving cell, a subcarrier spacing corresponding to a synchronization signal of the serving cell and a subcarrier spacing corresponding to a broadcast channel of the serving cell; and the transceiver unit is further configured to: send the synchronization signal of the serving cell in the serving cell based on the subcarrier spacing that is determined by the processing unit and that corresponds to the synchronization signal of the serving cell, and send the broadcast channel of the serving cell in the serving cell based on the subcarrier spacing that is determined by the processing unit and that corresponds to the broadcast channel of the serving cell, where a master information block of the serving cell carried on the broadcast channel includes subcarrier spacing indication information, and the subcarrier spacing indication information is used to indicate the subcarrier spacing of the serving cell to the UE.

Optionally, in a possible implementation of the fourth aspect, the processing unit is further configured to determine a subcarrier spacing corresponding to a synchronization signal of the serving cell and a subcarrier spacing corresponding to a broadcast channel of the serving cell; and the transceiver unit is further configured to: send the synchronization signal of the serving cell in the serving cell based on the subcarrier spacing that is determined by the processing unit and that corresponds to the synchronization signal of the serving cell, and send the broadcast channel of the serving cell in the serving cell based on the subcarrier spacing that is determined by the processing unit and that corresponds to the broadcast channel of the serving cell, where a master information block of the serving cell carried on the broadcast channel includes subcarrier spacing indication information, and the subcarrier spacing indication information is used to indicate the subcarrier spacing of the serving cell to the UE.

For beneficial effects of the network device provided in the fourth aspect and all possible implementations of the fourth aspect, refer to beneficial effects brought by the first aspect and all possible implementations of the first aspect, and details are not described herein again.

With reference to the first aspect and all possible implementations of the first aspect, the second aspect and all possible implementations of the second aspect, the third aspect and all possible implementations of the third aspect, and the fourth aspect and all possible implementations of the fourth aspect, the subcarrier spacing corresponding to the synchronization signal of the serving cell and the subcarrier spacing corresponding to the broadcast channel of the serving cell are the same, and are a largest subcarrier spacing in the subcarrier spacing set corresponding to the serving cell.

With reference to the first aspect and all possible implementations of the first aspect, the second aspect and all possible implementations of the second aspect, the third aspect and all possible implementations of the third aspect, and the fourth aspect and all possible implementations of the fourth aspect, both a cyclic prefix corresponding to the synchronization signal of the serving cell and a cyclic prefix corresponding to the broadcast channel of the serving cell are greater than a cyclic prefix corresponding to a data channel of the serving cell.

Based on the information communication method provided in the possible implementations, coverage of the synchronization signal and the broadcast channel of the serving cell can be expanded, and robustness of the synchronization signal and the broadcast channel of the serving cell can be improved.

With reference to the first aspect and all possible implementations of the first aspect, the second aspect and all possible implementations of the second aspect, the third aspect and all possible implementations of the third aspect, and the fourth aspect and all possible implementations of the fourth aspect, the system parameter of the serving cell includes one or more of a subframe length, a quantity of symbols included in a subframe, or a cyclic prefix CP length.

Based on the information communication method, the user equipment, and the network device provided in this application, when the serving cell uses different system parameters in different services, different deployment scenarios, and different spectrums, the UE and the network device may determine, by using a subcarrier spacing currently used by the serving cell, a system parameter currently used by the serving cell, so that the UE and the network device may perform information communication in the serving cell by using the system parameter, thereby improving information communication efficiency.

BRIEF DESCRIPTION OF THE DRAWINGS

FIG. 8 is a schematic flowchart of still another information communication method according to this application;

FIG. 9 is a schematic flowchart of still another information communication method according to this application;

DETAILED DESCRIPTION OF ILLUSTRATIVE EMBODIMENTS

Figure 1:
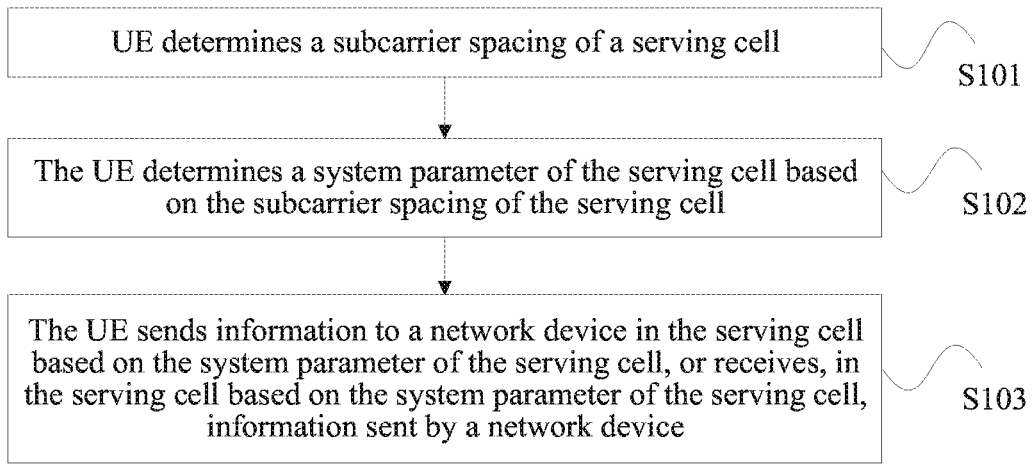
FIG. 1 is a schematic flowchart of an information communication method according to this application.

User equipment UE mentioned in this application may be a wireless terminal, such as a mobile phone or a tablet computer. The wireless terminal includes a device that provides a user with a voice service and/or a data service. Optionally, the device may be a handheld device with a radio connection function, or another processing device connected to a wireless modem. In addition, the wireless terminal may communicate with one or more core networks through a radio access network (RAN). For example, the wireless terminal may be a mobile terminal, such as a mobile phone (or referred to as a "cellular" phone) or a computer with a mobile terminal. The computer with a mobile terminal may be a portable, pocket-sized, handheld, or computer built-in mobile apparatus, or an in-vehicle mobile apparatus, which can exchange voice and/or data with the core network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal an access terminal, a user terminal, a user agent, a user device, or user equipment. The user equipment in this application may also be a vehicle or the like in V2X (Vehicle to everything) communication.

A network device mentioned in this application may be any device in a cellular communications network, for example, a base station (such as the access point), and the base station may be a device that is in an access network and that communicates with the wireless terminal over an air interface by using one or more sectors. The base station may be configured to convert a received over-the-air frame to an IP packet and convert a received IP packet to an over-the-air frame and serve as a router between the wireless terminal and a rest portion of the access network. The rest portion of the access network may include an Internet Protocol (IP) network. The base station may further coordinate attribute management on the air interface. For example, the base station may be a base transceiver station (BTS) in GSM or CDMA, or a NodeB (NodeB) in WCDMA, or an evolved NodeB (NodeB, eNB, or e-NodeB,) in LTE. This is not limited in this application. The network device in this application may be a terminal device in D2D (Device to Device) communication that is similar to the user equipment in this application, or may be a vehicle or the like in the V2X (Vehicle to everything) communication.

An information communication method provided in this application may be applicable to user equipment and a network device in a 5G communications system, a Long Term Evolution (LTE) communications system, and user equipment and a network device in the LTE communications system. The network device described herein may include at least one serving cell. Certainly, the information communication method in this application includes but is not limited to the foregoing application scenarios. The information communication method provided in this application can be used in all scenarios in which a serving cell supports a plurality of sets of system parameters.

The information communication method provided in this application aims to resolve a technical problem in the prior art of how to determine a system parameter used by the serving cell.

FIG. 1 is a schematic flowchart of an information communication method according to this application. This embodiment relates to a process in which UE determines a system parameter of a serving cell based on a subcarrier spacing of the serving cell. As shown in FIG. 1, the method includes the following steps.

S101. The UE determines a subcarrier spacing of a serving cell.

Specifically, the UE may determine the subcarrier spacing of the serving cell (serving cell), namely, a subcarrier spacing of a serving cell corresponding to the user equipment. The serving cell corresponding to the user equipment herein may be a serving cell configured by a network device for the UE, or a serving cell serving the UE, or a serving cell being accessed by the UE. The foregoing serving cell may be a primary serving cell of the UE, or a secondary serving cell of the UE. In an implementation of this application, the foregoing serving cell may also be referred to as a carrier. To be specific, one serving cell is one carrier.

Optionally, the UE may determine the subcarrier spacing of the serving cell based on a carrier frequency of the serving cell or based on a frequency set corresponding to the serving cell. An implementation in which the UE determines the subcarrier spacing of the serving cell is described in detail in the following.

In addition, the UE may determine the subcarrier spacing of the serving cell in an existing manner, and details are not described in this application.

S102. The UE determines a system parameter of the serving cell based on the subcarrier spacing of the serving cell.

Specifically, the UE may determine the system parameter of the serving cell based on the subcarrier spacing of the serving cell and a preset correspondence between a subcarrier spacing and a system parameter; or may calculate a system parameter based on the subcarrier spacing of the serving cell, and use the calculated system parameter as the system parameter of the serving cell. Certainly, the UE may determine the system parameter of the serving cell based on the subcarrier spacing of the serving cell in an existing manner, and details are not described in this application. The system parameter of the serving cell may include one or more of parameters such as a subframe length, a quantity of symbols included in a subframe, an effective symbol length, or a cyclic prefix (CP) length.

An example in which the UE determines the system parameter of the serving cell based on the subcarrier spacing of the serving cell and the preset correspondence between a subcarrier spacing and a system parameter is used. During specific implementation, after determining the subcarrier spacing of the serving cell, the UE may search, based on the subcarrier spacing, the preset correspondence for a system parameter corresponding to the subcarrier spacing, and the found system parameter is the system parameter of the serving cell. The preset correspondence may be set based on a user requirement. For example, the preset association may be shown in the following Table 1 and Table 2. It should be noted that a value in Table 1 and Table 2 is merely an example, and may be a rounded value. For example, the effective symbol length and the CP length in this embodiment may be approximate to values in the table. In addition, a parameter interdependency in the table is not limited.

TABLE 1

|  | System Parameter 1 | System Parameter 2 | System Parameter 3 | System Parameter 4 |
|---|---|---|---|---|
| Subcarrier Spacing (kHz) | 15 | 30 | 60 | 120 |

TABLE 1-continued

| | System Parameter 1 | | System Parameter 2 | | System Parameter 3 | | System Parameter 4 | |
|---|---|---|---|---|---|---|---|---|
| Subframe Length (ms) | 1 | | 0.5 | | 0.25 | | 0.125 | |
| Symbol Quantity | 14 | 12 | 14 | 12 | 14 | 12 | 14 | 12 |
| Effective Symbol Length (μs) | 66.67 | | 33.33 | | 16.67 | | 8.33 | |
| CP Length (μs) | 4.76 | 16.67 | 2.38 | 8.33 | 1.19 | 4.17 | 0.59 | 2.09 |
| CP Overheads | ~6.7% | ~20% | ~6.7% | ~20% | ~6.7% | ~20% | ~6.7% | ~20% |

TABLE 2

| | System Parameter 5 | | System Parameter 6 | | System Parameter 7 | | System Parameter 8 | |
|---|---|---|---|---|---|---|---|---|
| Subcarrier Spacing (kHz) | 17.5 | | 35 | | 70 | | 140 | |
| Subframe Length (ms) | 1 | 1.0 | 0.5 | 0.5 | 0.25 | | 0.125 | 0.125 |
| Symbol Quantity | 16 | 14 | 16 | 14 | 16 | 14 | 16 | 14 |
| Effective Symbol Length (μs) | 57.14 | | 28.57 | | 14.285 | | 7.14 | |
| CP Length (μs) | 5.36 | 14.3 | 2.68 | 7.15 | 1.34 | 3.575 | 0.67 | 1.7875 |
| CP Overheads | ~8.6% | ~20% | ~8.6% | ~20% | ~8.6% | ~20% | ~8.6% | ~20% |

For example, as shown in Table 1, when the subcarrier spacing is 15 kHz, the system parameter of the UE may be a system parameter 1. The system parameter 1 includes: a subframe length 1 ms, a symbol quantity 12 or 14, an effective symbol length 66.67 μs, a CP length 4.76 μs or 16.67 μs, and CP overheads less than or equal to 6.7%.

It should be noted that subcarrier spacings corresponding to system parameters shown in Table 1 are a multiple of 15 kHz, so that these system parameters and subcarrier spacings may match an existing LTE systems. A system parameter 5 shown in Table 2 corresponds to a subcarrier spacing 17.5 kHz, so that the system parameter and the subcarrier spacing may support a relatively short transmission time interval (TTI), for example, a TTI with 0.125 ms. GP overheads may remain consistent in different TTIs.

S103. The UE sends information to a network device in the serving cell based on the system parameter of the serving cell, or receives, in the serving cell based on the system parameter of the serving cell, information from a network device.

Specifically, after obtaining the system parameter of the serving cell, the UE may perform information communication with the network device in the serving cell by using the system parameter. For example, the UE may send the information to the network device in the serving cell based on the system parameter of the serving cell, and the information may be, for example, uplink data or uplink control information. The UE may further receive, in the serving cell based on the system parameter of the serving cell, the information from the network device, and the information may be, for example, downlink data, downlink control information, or a downlink reference signal.

Based on the information communication method provided in this application, when the serving cell uses different system parameters in different services, different deployment scenarios, and different spectrums, the UE may determine, by using a subcarrier spacing currently used by the serving cell, a system parameter currently used by the serving cell, so that the UE may perform information communication with the network device in the serving cell by using the system parameter, thereby improving information communication efficiency.

Further, based on the foregoing embodiment, this embodiment relates to a specific process in which the UE determines the subcarrier spacing of the serving cell. In this case, S101 may include the following three implementations.

Figure 2:
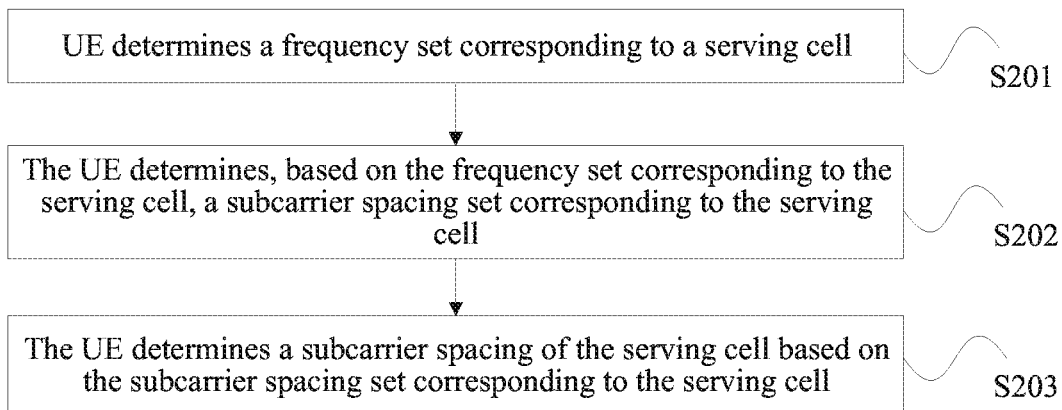
FIG. 2 is a schematic flowchart of another information communication method according to this application.

In a first implementation, the UE determines the subcarrier spacing of the serving cell based on the frequency set corresponding to the serving cell. FIG. 2 is a schematic flowchart of another information communication method according to this application. As shown in FIG. 2, the method may include the following steps.

S201. The UE determines a frequency set corresponding to a serving cell.

Specifically, the UE may determine the frequency set of the serving cell based on a carrier frequency of the serving cell. For example, the UE may determine that a frequency set including the carrier frequency of the serving cell is the frequency set corresponding to the serving cell. Alternatively, the UE may determine, based on a preset correspondence between a serving cell and a frequency set, the frequency set corresponding to the serving cell. For example, the UE may determine, based on an identifier of the serving cell and a preset correspondence between a serving cell identifier and a frequency set, the frequency set corresponding to the serving cell.

S202. The UE determines, based on the frequency set corresponding to the serving cell, a subcarrier spacing set corresponding to the serving cell.

Specifically, the UE may search, based on the frequency set corresponding to the serving cell, a preset correspondence between a frequency set and a subcarrier spacing set for a subcarrier spacing set associated with the frequency set corresponding to the serving cell, and the subcarrier spacing set is the subcarrier spacing set corresponding to the serving cell. Alternatively, the UE may calculate a subcarrier spacing set based on the frequency set corresponding to the serving cell, and use the calculated subcarrier spacing set as the subcarrier spacing set corresponding to the serving cell.

When the UE determines, based on the frequency set corresponding to the serving cell and the preset correspondence between a frequency set and a subcarrier spacing set, the subcarrier spacing set corresponding to the serving cell, the preset correspondence between a frequency set and a subcarrier spacing set may include X subcarrier spacing sets. Any one of the X subcarrier spacing sets may include at least one subcarrier spacing, which may be determined based on a service corresponding to the serving cell. X may be a positive integer greater than or equal to 1, and a specific value of X may be determined based on a user requirement. It should be noted that a first subcarrier spacing set in the X subcarrier spacing sets includes at least one subcarrier spacing that does not belong to a second subcarrier spacing set in the X subcarrier spacing sets. The first subcarrier spacing set described herein is any one of the X subcarrier spacing sets, and the second subcarrier spacing set described herein is any one of the X subcarrier spacing sets except the first subcarrier spacing set. Optionally, the preset correspondence between a frequency set and a subcarrier spacing set may further include X frequency sets. The X frequency sets and the X subcarrier spacing sets may be in a one-to-one correspondence. To be specific, each frequency set corresponds to one subcarrier spacing set. The X frequency sets may correspond to a spectrum range supported by a communications system.

Optionally, the preset correspondence between a frequency set and a subcarrier spacing set may be, for example, shown in Table 3.

TABLE 3

| X Frequency Sets | X Subcarrier Spacing Sets | |
|---|---|---|
| {F} ≤ 6 GHz | Subcarrier spacing 15 kHz | Subcarrier spacing 30 kHz |
| 6 GHz < {F} ≤ 30 GHz | Subcarrier spacing 30 kHz | Subcarrier spacing 60 kHz |
| 30 GHz < {F} ≤ 100 GHz | Subcarrier spacing 120 kHz | Subcarrier spacing 240 kHz |

In the correspondence shown in Table 3, S202 may be:

When each frequency included in the frequency set corresponding to the serving cell is less than or equal to 6 GHz, the UE determines that the subcarrier spacing set corresponding to the serving cell includes a subcarrier spacing 15 kHz and a subcarrier spacing 30 kHz.

Alternatively, when each frequency included in the frequency set corresponding to the serving cell is greater than 6 GHz and less than or equal to 30 GHz, the UE determines that the subcarrier spacing set corresponding to the serving cell includes a subcarrier spacing 30 kHz and a subcarrier spacing 60 kHz.

Alternatively, when each frequency included in the frequency set corresponding to the serving cell is greater than 30 GHz and less than or equal to 100 GHz, the UE determines that the subcarrier spacing set corresponding to the serving cell includes a subcarrier spacing 120 kHz and a subcarrier spacing 240 kHz.

Optionally, the preset correspondence between a frequency set and a subcarrier spacing set may be, for example, shown in Table 4.

TABLE 4

| X Frequency Sets | X Subcarrier Spacing Sets | |
|---|---|---|
| {F} ≤ 3 GHz | Subcarrier spacing 15 kHz | Subcarrier spacing 17.5 kHz |

TABLE 4-continued

| X Frequency Sets | X Subcarrier Spacing Sets | |
|---|---|---|
| 3 GHz < {F} ≤ 6 GHz | Subcarrier spacing 17.5 kHz | Subcarrier spacing 35 kHz |
| 6 GHz < {F} ≤ 30 GHz | Subcarrier spacing 35 kHz | Subcarrier spacing 70 kHz |
| 30 GHz < {F} ≤ 100 GHz | Subcarrier spacing 140 kHz | Subcarrier spacing 280 kHz |

In the correspondence shown in Table 4, S202 may be:

When each frequency included in the frequency set corresponding to the serving cell is less than or equal to 3 GHz, the UE determines that the subcarrier spacing set corresponding to the serving cell includes a subcarrier spacing 15 kHz and a subcarrier spacing 17.5 kHz.

Alternatively, when each frequency included in the frequency set corresponding to the serving cell is greater than 3 GHz and less than or equal to 6 GHz, the UE determines that the subcarrier spacing set corresponding to the serving cell includes a subcarrier spacing 17.5 kHz and a subcarrier spacing 35 kHz.

Alternatively, when each frequency included in the frequency set corresponding to the serving cell is greater than 6 GHz and less than or equal to 30 GHz, the UE determines that the subcarrier spacing set corresponding to the serving cell includes a subcarrier spacing 35 kHz and a subcarrier spacing 70 kHz.

Alternatively, when each frequency included in the frequency set corresponding to the serving cell is greater than 30 GHz and less than or equal to 100 GHz, the UE determines that the subcarrier spacing set corresponding to the serving cell includes a subcarrier spacing 140 kHz and a subcarrier spacing 280 kHz.

Optionally, the preset correspondence between a frequency set and a subcarrier spacing set may be, for example, shown in Table 5.

TABLE 5

| X Frequency Sets | X Subcarrier Spacing Sets | |
|---|---|---|
| {F} ≤ 6 GHz | Subcarrier spacing 15 kHz | Subcarrier spacing 30 kHz |
| 6 GHz < {F} ≤ 30 GHz | Subcarrier spacing 60 kHz | Subcarrier spacing 120 kHz |
| 30 GHz < {F} ≤ 100 GHz | Subcarrier spacing 240 kHz | Subcarrier spacing 480 kHz |

In the correspondence shown in Table 5, S202 may be:

When each frequency included in the frequency set corresponding to the serving cell is less than or equal to 6 GHz, the UE determines that the subcarrier spacing set corresponding to the serving cell includes a subcarrier spacing 15 kHz and a subcarrier spacing 30 kHz.

Alternatively, when each frequency included in the frequency set corresponding to the serving cell is greater than 6 GHz and less than or equal to 30 GHz, the UE determines that the subcarrier spacing set corresponding to the serving cell includes a subcarrier spacing 60 kHz and a subcarrier spacing 120 kHz.

Alternatively, when each frequency included in the frequency set corresponding to the serving cell is greater than 30 GHz and less than or equal to 100 GHz, the UE determines that the subcarrier spacing set corresponding to the serving cell includes a subcarrier spacing 240 kHz and a subcarrier spacing 480 kHz.

Optionally, the preset correspondence between a frequency set and a subcarrier spacing set may be, for example, shown in Table 6.

TABLE 6

| X Frequency Sets | X Subcarrier Spacing Sets | |
|---|---|---|
| {F} ≤ 3 GHz | Subcarrier spacing 15 kHz | Subcarrier spacing 17.5 kHz |
| 3 GHz < {F} ≤ 6 GHz | Subcarrier spacing 17.5 kHz | Subcarrier spacing 35 kHz |
| 6 GHz < {F} ≤ 30 GHz | Subcarrier spacing 70 kHz | Subcarrier spacing 140 kHz |
| 30 GHz < {F} ≤ 100 GHz | Subcarrier spacing 280 kHz | Subcarrier spacing 560 kHz |

In the correspondence shown in Table 6, S202 may be:

When each frequency included in the frequency set corresponding to the serving cell is less than or equal to 3 GHz, the UE determines that the subcarrier spacing set corresponding to the serving cell includes a subcarrier spacing 15 kHz and a subcarrier spacing 17.5 kHz.

Alternatively, when each frequency included in the frequency set corresponding to the serving cell is greater than 3 GHz and less than or equal to 6 GHz, the UE determines that the subcarrier spacing set corresponding to the serving cell includes a subcarrier spacing 17.5 kHz and a subcarrier spacing 35 kHz.

Alternatively, when each frequency included in the frequency set corresponding to the serving cell is greater than 6 GHz and less than or equal to 30 GHz, the UE determines that the subcarrier spacing set corresponding to the serving cell includes a subcarrier spacing 70 kHz and a subcarrier spacing 140 kHz.

Alternatively, when each frequency included in the frequency set corresponding to the serving cell is greater than 30 GHz and less than or equal to 100 GHz, the UE determines that the subcarrier spacing set corresponding to the serving cell includes a subcarrier spacing 280 kHz and a subcarrier spacing 560 kHz.

Optionally, the preset correspondence between a frequency set and a subcarrier spacing set may be, for example, shown in Table 7.

TABLE 7

| X Frequency Sets | X Subcarrier Spacing Sets | |
|---|---|---|
| {F} ≤ 6 GHz | Subcarrier spacing 15 kHz | Subcarrier spacing 30 kHz |
| 6 GHz < {F} ≤ 40 GHz | Subcarrier spacing 30 kHz | Subcarrier spacing 60 kHz |
| 40 GHz < {F} ≤ 80 GHz | Subcarrier spacing 60 kHz | Subcarrier spacing 120 kHz |
| {F} >80 GHz | Subcarrier spacing 120 kHz | Subcarrier spacing 240 kHz |

In the correspondence shown in Table 7, S202 may be:

When each frequency included in the frequency set corresponding to the serving cell is less than or equal to 6 GHz, the UE determines that the subcarrier spacing set corresponding to the serving cell includes a subcarrier spacing 15 kHz and a subcarrier spacing 30 kHz.

Alternatively, when each frequency included in the frequency set corresponding to the serving cell is greater than 6 GHz and less than or equal to 40 GHz, the UE determines that the subcarrier spacing set corresponding to the serving cell includes a subcarrier spacing 30 kHz and a subcarrier spacing 60 kHz.

Alternatively, when each frequency included in the frequency set corresponding to the serving cell is greater than 40 GHz and less than or equal to 80 GHz, the UE determines that the subcarrier spacing set corresponding to the serving cell includes a subcarrier spacing 60 kHz and a subcarrier spacing 120 kHz.

Alternatively, when each frequency included in the frequency set corresponding to the serving cell is greater than 80 GHz, the UE determines that the subcarrier spacing set corresponding to the serving cell includes a subcarrier spacing 120 kHz and a subcarrier spacing 240 kHz.

Optionally, the preset correspondence between a frequency set and a subcarrier spacing set may be, for example, shown in Table 8.

TABLE 8

| X Frequency Sets | X Subcarrier Spacing Sets | |
|---|---|---|
| {F} ≤ 3 GHz | Subcarrier spacing 15 kHz | Subcarrier spacing 17.5 kHz |
| 3 GHz < {F} ≤ 6 GHz | Subcarrier spacing 17.5 kHz | Subcarrier spacing 35 kHz |
| 6 GHz < {F} ≤ 40 GHz | Subcarrier spacing 35 kHz | Subcarrier spacing 70 kHz |
| 40 GHz < {F} ≤ 80 GHz | Subcarrier spacing 70 kHz | Subcarrier spacing 140 kHz |
| {F} > 80 GHz | Subcarrier spacing 280 kHz | Subcarrier spacing 560 kHz |

In the correspondence shown in Table 8, S202 may be:

When each frequency included in the frequency set corresponding to the serving cell is less than or equal to 3 GHz, the UE determines that the subcarrier spacing set corresponding to the serving cell includes a subcarrier spacing 15 kHz and a subcarrier spacing 17.5 kHz.

Alternatively, when each frequency included in the frequency set corresponding to the serving cell is greater than 3 GHz and less than or equal to 6 GHz, the UE determines that the subcarrier spacing set corresponding to the serving cell includes a subcarrier spacing 17.5 kHz and a subcarrier spacing 35 kHz.

Alternatively, when each frequency included in the frequency set corresponding to the serving cell is greater than 6 GHz and less than or equal to 40 GHz, the UE determines that the subcarrier spacing set corresponding to the serving cell includes a subcarrier spacing 35 kHz and a subcarrier spacing 70 kHz.

Alternatively, when each frequency included in the frequency set corresponding to the serving cell is greater than 40 GHz and less than or equal to 80 GHz, the UE determines that the subcarrier spacing set corresponding to the serving cell includes a subcarrier spacing 70 kHz and a subcarrier spacing 140 kHz.

Alternatively, when each frequency included in the frequency set corresponding to the serving cell is greater than 80 GHz, the UE determines that the subcarrier spacing set corresponding to the serving cell includes a subcarrier spacing 280 kHz and a subcarrier spacing 560 kHz.

In this embodiment, the serving cell may correspond to one subcarrier spacing set, and the subcarrier spacing set may include different subcarrier spacings, so that the serving cell may use the different subcarrier spacings in different scenarios, thereby improving performance of the communications system by using a subcarrier spacing better matching a scenario. For example, for a large delay spread scenario, a relatively small subcarrier spacing in the subcarrier spacing set may be used. For a high-speed scenario, a relatively large subcarrier spacing in the subcarrier spacing set may be used. An example in which the subcarrier spacing set corresponding to the serving cell includes a subcarrier spacing 15 kHz and a subcarrier spacing 30 kHz when each frequency included in the frequency set corresponding to the serving cell is less than or equal to 6 GHz is used. In this case, for the large delay spread scenario, for example, for a scenario in which a delay spread is approximately up to 5 μs, the subcarrier spacing 15 kHz may be used. For the high-speed scenario, for example, for a high-speed scenario up to 500 km/h, the subcarrier spacing 30 kHz may be used.

In this embodiment, the correspondence between a frequency set and a subcarrier spacing set enumerated in Table 3 to Table 8 can enable each subcarrier spacing in each subcarrier spacing set to relatively well match a spectrum, thereby ensuring the performance of the communications system, and reducing a quantity of subcarrier spacings in each subcarrier spacing set to a full extent. The spectrum may include the set of different frequencies. It should be noted that the subcarrier spacing set shown in Table 3 to Table 8 may be applicable to a scenario of a same service, for example, a scenario of only an eMBB service. If the serving cell simultaneously supports a plurality of services, for example, the eMBB service and an MTC service, a quantity of subcarrier spacings in the subcarrier spacing set may be appropriately increased based on types of supported services, and may be determined based on a service type and a user requirement.

S203. The UE determines a subcarrier spacing of the serving cell based on the subcarrier spacing set corresponding to the serving cell.

In an implementation of this application, the UE may detect a synchronization signal of the serving cell based on the subcarrier spacing set corresponding to the serving cell, and determine the subcarrier spacing of the serving cell based on the detected synchronization signal of the serving cell. For example, the UE may determine the subcarrier spacing of the serving cell by blindly detecting the synchronization signal of the serving cell based on the subcarrier spacing set corresponding to the serving cell. During specific implementation, the UE may detect energy corresponding to each subcarrier spacing in the subcarrier spacing set corresponding to the serving cell. A subcarrier spacing with greatest energy is a subcarrier spacing corresponding to the synchronization signal of the serving cell, and the subcarrier spacing corresponding to the synchronization signal is the subcarrier spacing of the serving cell. It should be noted that, for details of detecting the energy corresponding to the subcarrier spacing by the UE, refer to the prior art, and details are not described in this application.

When the subcarrier spacing of the serving cell is determined in this manner, the subcarrier spacing set corresponding to the serving cell may include one or two subcarrier spacings (for example, a subcarrier spacing set shown in Table 3 to Table 8). Therefore, a quantity of times of blindly detecting the synchronization signal of the serving cell by the UE is reduced, a success rate of detecting the synchronization signal of the serving cell by the UE is increased, and duration in which the UE detects the synchronization signal of the serving cell is shortened. To be specific, duration in which the UE accesses the serving cell is shortened, and a success rate of accessing a cell by the UE is increased, so that a success rate of determining the subcarrier spacing of the serving cell by the UE is increased. The synchronization signal of the serving cell in this application may include one or more of a primary synchronization signal PSS or a secondary synchronization signal SSS of the serving cell.

In another implementation of this application, the UE may first determine, based on the subcarrier spacing set corresponding to the serving cell, a subcarrier spacing corresponding to a synchronization signal of the serving cell and a subcarrier spacing corresponding to a broadcast channel of the serving cell (the broadcast channel described herein may be a channel for transmitting a master information block (MIB)), so as to detect the synchronization signal of the serving cell based on the determined subcarrier spacing corresponding to the synchronization signal of the serving cell, and synchronize with the serving cell; and then detect the master information block of the serving cell based on the determined subcarrier spacing corresponding to the broadcast channel of the serving cell. The master information block may include subcarrier spacing indication information, and the subcarrier spacing indication information may indicate the subcarrier spacing of the serving cell to the UE, so that the UE may determine the subcarrier spacing of the serving cell based on the subcarrier spacing indication information. A specific implementation of indicating the subcarrier spacing is not limited in this application. For example, two bits in the master information block may be used to indicate the subcarrier spacing. Different bit values may correspond to different subcarrier spacings, so that the UE may determine the subcarrier spacing of the serving cell based on the bit value.

It should be noted that, for a specific implementation in which the UE detects the synchronization signal of the serving cell, synchronizes with the serving cell, and detects the master information block of the serving cell, refer to the prior art, and details are not described in this application.

When the subcarrier spacing of the serving cell is determined in this manner, the subcarrier spacing corresponding to the synchronization signal of the serving cell and the subcarrier spacing corresponding to the broadcast channel of the serving cell may be a subcarrier spacing in the subcarrier spacing set corresponding to the serving cell. Optionally, the subcarrier spacing of the serving cell may be the same as or may be different from the subcarrier spacing corresponding to the synchronization signal of the serving cell and the subcarrier spacing corresponding to the broadcast channel of the serving cell. In another implementation of this application, for each subcarrier spacing in the subcarrier spacing set corresponding to the serving cell, the subcarrier spacing corresponding to the synchronization signal of the serving cell and the subcarrier spacing corresponding to the broadcast channel of the serving cell may remain unchanged. For example, the subcarrier spacing corresponding to the synchronization signal of the serving cell and the subcarrier spacing corresponding to the broadcast channel of the serving cell may be the same, and are a largest subcarrier spacing in the subcarrier spacing set corresponding to the serving cell. For example, when the subcarrier spacing set includes a subcarrier spacing 15 kHz and a subcarrier spacing 30 kHz, both the subcarrier spacing corresponding to the synchronization signal of the serving cell and the subcarrier spacing corresponding to the broadcast channel of the serving cell may be 30 kHz. In this case, for different subcarrier spacings in the subcarrier spacing set corresponding to the serving cell, both the synchronization signal and the broadcast channel are sent by using a same subcarrier spacing, so that the UE can determine the subcarrier spacing of the serving cell without blindly detecting the synchronization signal. Therefore, duration in which the UE detects the synchronization signal is shortened. To be specific, duration in which the UE synchronizes with the serving cell is shortened, duration in which the UE accesses the serving cell is shortened, a success rate of detecting the synchronization signal of the serving cell by the UE is increased, and a success rate of accessing a cell by the UE is increased, so that a success rate of determining the subcarrier spacing of the serving cell by the UE is increased.

Further, a cyclic prefix corresponding to the synchronization signal of the serving cell and a cyclic prefix corresponding to the broadcast channel of the serving cell may be greater than a cyclic prefix corresponding to a data channel of the serving cell. For example, when the cyclic prefix corresponding to the data channel of the serving cell is approximately 2.38 µs or 4.76 µs, both the cyclic prefix corresponding to the synchronization signal of the serving cell and the cyclic prefix corresponding to the broadcast channel of the serving cell may be 5.13 µs. The cyclic prefix corresponding to the synchronization signal of the serving cell and the cyclic prefix corresponding to the broadcast channel of the serving cell herein may be a cyclic prefix corresponding to a symbol for transmitting the synchronization signal and a cyclic prefix corresponding to a symbol for transmitting the broadcast channel, and the cyclic prefix corresponding to the data channel may be a cyclic prefix corresponding to a symbol for transmitting data. In this manner, coverage of the synchronization signal and the broadcast channel of the serving cell can be expanded, and robustness of the synchronization signal and the broadcast channel of the serving cell can be improved.

Figure 3:
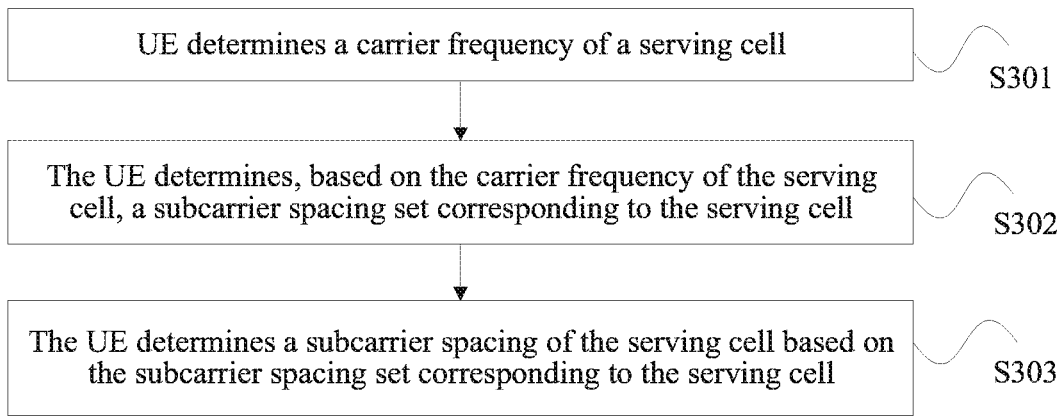
FIG. 3 is a schematic flowchart of still another information communication method according to this application.

In a second implementation, the UE determines the subcarrier spacing of the serving cell based on the carrier frequency of the serving cell. FIG. 3 is a schematic flowchart of still another information communication method according to this application. As shown in FIG. 3, the method may include the following steps.

S301. The UE determines a carrier frequency of a serving cell.

Specifically, the UE may obtain the carrier frequency of the serving cell through sweeping, or may obtain the carrier frequency of the serving cell based on a preset carrier frequency of the serving cell.

S302. The UE determines, based on the carrier frequency of the serving cell, a subcarrier spacing set corresponding to the serving cell.

Specifically, the UE may search, based on the carrier frequency of the serving cell, a preset correspondence between a carrier frequency and a subcarrier spacing set for a subcarrier spacing set corresponding to the carrier frequency of the serving cell, and the subcarrier spacing set is the subcarrier spacing set corresponding to the serving cell. Alternatively, the UE may calculate a subcarrier spacing set based on the carrier frequency of the serving cell, and use the calculated subcarrier spacing set as the subcarrier spacing set corresponding to the serving cell.

When the UE determines, based on the carrier frequency of the serving cell and the preset correspondence between a carrier frequency and a subcarrier spacing set, the subcarrier spacing set corresponding to the serving cell, the preset correspondence between a carrier frequency and a subcarrier spacing set may include X subcarrier spacing sets. For specific description of the X subcarrier spacing sets, refer to description of the X subcarrier spacing sets in S202, and details are not described again in this embodiment.

Optionally, the preset correspondence between a carrier frequency and a subcarrier spacing set may be, for example, shown in Table 9.

TABLE 9

| Carrier Frequency | X Subcarrier Spacing Sets | |
|---|---|---|
| F ≤ 6 GHz | Subcarrier spacing 15 kHz | Subcarrier spacing 30 kHz |
| 6 GHz < F ≤ 30 GHz | Subcarrier spacing 30 kHz | Subcarrier spacing 60 kHz |
| 30 GHz < F ≤ 100 GHz | Subcarrier spacing 120 kHz | Subcarrier spacing 240 kHz |

In the correspondence shown in Table 9, S302 may be:

When the carrier frequency of the serving cell is less than or equal to 6 GHz, the UE determines that the subcarrier spacing set corresponding to the serving cell includes a subcarrier spacing 15 kHz and a subcarrier spacing 30 kHz.

Alternatively, when the carrier frequency of the serving cell is greater than 6 GHz and less than or equal to 30 GHz, the UE determines that the subcarrier spacing set corresponding to the serving cell includes a subcarrier spacing 30 kHz and a subcarrier spacing 60 kHz.

Alternatively, when the carrier frequency of the serving cell is greater than 30 GHz and less than or equal to 100 GHz, the UE determines that the subcarrier spacing set corresponding to the serving cell includes a subcarrier spacing 120 kHz and a subcarrier spacing 240 kHz.

Optionally, the preset correspondence between a carrier frequency and a subcarrier spacing set may be, for example, shown in Table 10.

TABLE 10

| Carrier Frequency | X Subcarrier Spacing Sets | |
|---|---|---|
| F ≤ 3 GHz | Subcarrier spacing 15 kHz | Subcarrier spacing 17.5 kHz |
| 3 GHz < F ≤ 6 GHz | Subcarrier spacing 17.5 kHz | Subcarrier spacing 35 kHz |
| 6 GHz < F ≤ 30 GHz | Subcarrier spacing 35 kHz | Subcarrier spacing 70 kHz |
| 30 GHz < F ≤ 100 GHz | Subcarrier spacing 140 kHz | Subcarrier spacing 280 kHz |

In the correspondence shown in Table 10, S302 may be:

When the carrier frequency of the serving cell is less than or equal to 3 GHz, the UE determines that the subcarrier spacing set corresponding to the serving cell includes a subcarrier spacing 15 kHz and a subcarrier spacing 17.5 kHz.

Alternatively, when the carrier frequency of the serving cell is greater than 3 GHz and less than or equal to 6 GHz, the UE determines that the subcarrier spacing set corresponding to the serving cell includes a subcarrier spacing 17.5 kHz and a subcarrier spacing 35 kHz.

Alternatively, when the carrier frequency of the serving cell is greater than 6 GHz and less than or equal to 30 GHz, the UE determines that the subcarrier spacing set corresponding to the serving cell includes a subcarrier spacing 35 kHz and a subcarrier spacing 70 kHz.

Alternatively, when the carrier frequency of the serving cell is greater than 30 GHz and less than or equal to 100 GHz, the UE determines that the subcarrier spacing set corresponding to the serving cell includes a subcarrier spacing 140 kHz and a subcarrier spacing 280 kHz.

Optionally, the preset correspondence between a carrier frequency and a subcarrier spacing set may be, for example, shown in Table 11.

TABLE 11

| Carrier Frequency | X Subcarrier Spacing Sets | |
|---|---|---|
| F ≤ 6 GHz | Subcarrier spacing 15 kHz | Subcarrier spacing 30 kHz |
| 6 GHz < F ≤ 30 GHz | Subcarrier spacing 60 kHz | Subcarrier spacing 120 kHz |
| 30 GHz < F ≤ 100 GHz | Subcarrier spacing 240 kHz | Subcarrier spacing 480 kHz |

In the correspondence shown in Table 11, S302 may be:

When the carrier frequency of the serving cell is less than or equal to 6 GHz, the UE determines that the subcarrier spacing set corresponding to the serving cell includes a subcarrier spacing 15 kHz and a subcarrier spacing 30 kHz.

Alternatively, when the carrier frequency of the serving cell is greater than 6 GHz and less than or equal to 30 GHz, the UE determines that the subcarrier spacing set corresponding to the serving cell includes a subcarrier spacing 60 kHz and a subcarrier spacing 120 kHz.

Alternatively, when the carrier frequency of the serving cell is greater than 30 GHz and less than or equal to 100 GHz, the UE determines that the subcarrier spacing set corresponding to the serving cell includes a subcarrier spacing 240 kHz and a subcarrier spacing 480 kHz.

Optionally, the preset correspondence between a carrier frequency and a subcarrier spacing set may be, for example, shown in Table 12.

TABLE 12

| Carrier Frequency | X Subcarrier Spacing Sets | |
|---|---|---|
| F ≤ 3 GHz | Subcarrier spacing 15 kHz | Subcarrier spacing 17.5 kHz |
| 3 GHz < F ≤ 6 GHz | Subcarrier spacing 17.5 kHz | Subcarrier spacing 35 kHz |
| 6 GHz < F ≤ 30 GHz | Subcarrier spacing 70 kHz | Subcarrier spacing 140 kHz |
| 30 GHz < F ≤ 100 GHz | Subcarrier spacing 280 kHz | Subcarrier spacing 560 kHz |

In the correspondence shown in Table 12, S302 may be:

When the carrier frequency of the serving cell is less than or equal to 3 GHz, the UE determines that the subcarrier spacing set corresponding to the serving cell includes a subcarrier spacing 15 kHz and a subcarrier spacing 17.5 kHz.

Alternatively, when the carrier frequency of the serving cell is greater than 3 GHz and less than or equal to 6 GHz, the UE determines that the subcarrier spacing set corresponding to the serving cell includes a subcarrier spacing 17.5 kHz and a subcarrier spacing 35 kHz.

Alternatively, when the carrier frequency of the serving cell is greater than 6 GHz and less than or equal to 30 GHz, the UE determines that the subcarrier spacing set corresponding to the serving cell includes a subcarrier spacing 70 kHz and a subcarrier spacing 140 kHz.

Alternatively, when the carrier frequency of the serving cell is greater than 30 GHz and less than or equal to 100 GHz, the UE determines that the subcarrier spacing set corresponding to the serving cell includes a subcarrier spacing 280 kHz and a subcarrier spacing 560 kHz.

Optionally, the preset correspondence between a carrier frequency and a subcarrier spacing set may be, for example, shown in Table 13.

TABLE 13

| Carrier Frequency | X Subcarrier Spacing Sets | |
|---|---|---|
| F ≤ 6 GHz | Subcarrier spacing 15 kHz | Subcarrier spacing 30 kHz |
| 6 GHz < F ≤ 40 GHz | Subcarrier spacing 30 kHz | Subcarrier spacing 60 kHz |
| 40 GHz < F ≤ 80 GHz | Subcarrier spacing 60 kHz | Subcarrier spacing 120 kHz |
| F > 80 GHz | Subcarrier spacing 120 kHz | Subcarrier spacing 240 kHz |

In the correspondence shown in Table 13, S302 may be:

When the carrier frequency of the serving cell is less than or equal to 6 GHz, the UE determines that the subcarrier spacing set corresponding to the serving cell includes a subcarrier spacing 15 kHz and a subcarrier spacing 30 kHz.

Alternatively, when the carrier frequency of the serving cell is greater than 6 GHz and less than or equal to 40 GHz, the UE determines that the subcarrier spacing set corresponding to the serving cell includes a subcarrier spacing 30 kHz and a subcarrier spacing 60 kHz.

Alternatively, when the carrier frequency of the serving cell is greater than 40 GHz and less than or equal to 80 GHz, the UE determines that the subcarrier spacing set corresponding to the serving cell includes a subcarrier spacing 60 kHz and a subcarrier spacing 120 kHz.

Alternatively, when the carrier frequency of the serving cell is greater than 80 GHz, the UE determines that the subcarrier spacing set corresponding to the serving cell includes a subcarrier spacing 120 kHz and a subcarrier spacing 240 kHz.

Optionally, the preset correspondence between a carrier frequency and a subcarrier spacing set may be, for example, shown in Table 14.

TABLE 14

| Carrier Frequency | X Subcarrier Spacing Sets | |
|---|---|---|
| F ≤ 3 GHz | Subcarrier spacing 15 kHz | Subcarrier spacing 17.5 kHz |
| 3 GHz < F ≤ 6 GHz | Subcarrier spacing 17.5 kHz | Subcarrier spacing 35 kHz |
| 6 GHz < F ≤ 40 GHz | Subcarrier spacing 35 kHz | Subcarrier spacing 70 kHz |
| 40 GHz < F ≤ 80 GHz | Subcarrier spacing 70 kHz | Subcarrier spacing 140 kHz |
| F > 80 GHz | Subcarrier spacing 280 kHz | Subcarrier spacing 560 kHz |

In the correspondence shown in Table 14, S302 may be:

When the carrier frequency of the serving cell is less than or equal to 3 GHz, the UE determines that the subcarrier spacing set corresponding to the serving cell includes a subcarrier spacing 15 kHz and a subcarrier spacing 17.5 kHz.

Alternatively, when the carrier frequency of the serving cell is greater than 3 GHz and less than or equal to 6 GHz, the UE determines that the subcarrier spacing set corresponding to the serving cell includes a subcarrier spacing 17.5 kHz and a subcarrier spacing 35 kHz.

Alternatively, when the carrier frequency of the serving cell is greater than 6 GHz and less than or equal to 40 GHz, the UE determines that the subcarrier spacing set corresponding to the serving cell includes a subcarrier spacing 35 kHz and a subcarrier spacing 70 kHz.

Alternatively, when the carrier frequency of the serving cell is greater than 40 GHz and less than or equal to 80 GHz, the UE determines that the subcarrier spacing set corresponding to the serving cell includes a subcarrier spacing 70 kHz and a subcarrier spacing 140 kHz.

Alternatively, when the carrier frequency of the serving cell is greater than 80 GHz, the UE determines that the subcarrier spacing set corresponding to the serving cell includes a subcarrier spacing 280 kHz and a subcarrier spacing 560 kHz.

In this embodiment, the correspondence between a carrier frequency and a subcarrier spacing set enumerated in Table 9 to Table 14 can enable each subcarrier spacing in each subcarrier spacing set to relatively well match a spectrum, thereby ensuring performance of a communications system, and reducing a quantity of subcarrier spacings in each subcarrier spacing set to a full extent. The spectrum may include the set of different frequencies. It should be noted that the subcarrier spacing set shown in Table 9 to Table 14 may be applicable to a scenario of a same service. To be specific, the serving cell supports only one service, for example, only an eMBB service. If the serving cell simultaneously supports a plurality of services, for example, the eMBB service and an MTC service, a quantity of subcarrier spacings in the subcarrier spacing set may be appropriately increased based on types of supported services, and may be determined based on a service type and a user requirement.

S303. The UE determines a subcarrier spacing of the serving cell based on the subcarrier spacing set corresponding to the serving cell.

Specifically, for a specific execution process of S303, refer to description of S203 shown in FIG. 2, and details are not described herein again.

Figure 4:
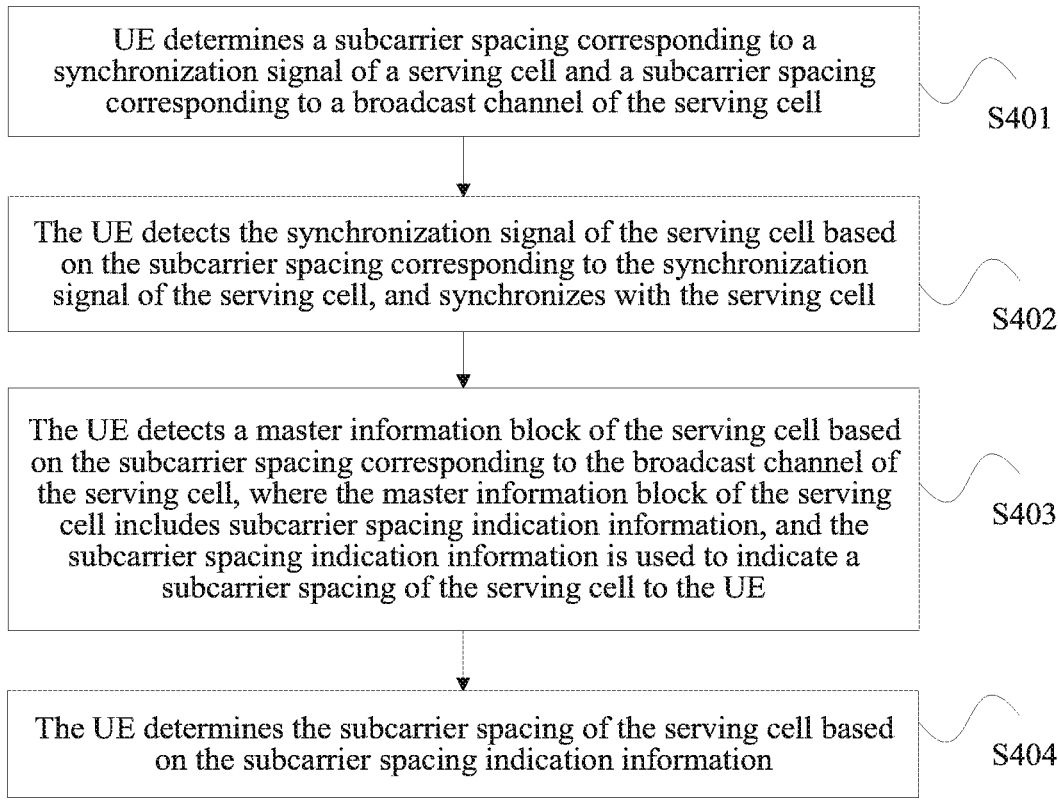
FIG. 4 is a schematic flowchart of still another information communication method according to this application.

In a third implementation, the UE determines the subcarrier spacing of the serving cell based on a subcarrier spacing corresponding to a synchronization signal of the serving cell and a subcarrier spacing corresponding to a broadcast channel of the serving cell. This manner is applicable to a case in which all serving cells send the synchronization signal and the broadcast channel by using a same subcarrier spacing. In this manner, the UE can determine the subcarrier spacing of the serving cell without blindly detecting the synchronization signal. Therefore, duration in which the UE detects the synchronization signal is shortened. To be specific, duration in which the UE synchronizes with the serving cell is shortened, duration in which the UE accesses the serving cell is shortened, a success rate of detecting the synchronization signal of the serving cell by the UE is increased, and a success rate of accessing a cell by the UE is increased, so that a success rate of determining the subcarrier spacing of the serving cell by the UE is increased. FIG. 4 is a schematic flowchart of still another information communication method according to this application. As shown in FIG. 4, the method may include the following steps.

S401. The UE determines a subcarrier spacing corresponding to a synchronization signal of a serving cell and a subcarrier spacing corresponding to a broadcast channel of the serving cell.

Specifically, in this embodiment, all serving cells send the synchronization signal and the broadcast channel by using a same subcarrier spacing. Therefore, the UE may determine, based on the subcarrier spacing, the subcarrier spacing corresponding to the synchronization signal of the serving cell and the subcarrier spacing corresponding to the broadcast channel of the serving cell. A specific value corresponding to the subcarrier spacing adaptive to all the serving cells may be preset in the UE, so that the UE may obtain the subcarrier spacing at any time, so as to determine, based on the subcarrier spacing, the subcarrier spacing corresponding to the synchronization signal of the serving cell and the subcarrier spacing corresponding to the broadcast channel of the serving cell.

S402. The UE detects the synchronization signal of the serving cell based on the subcarrier spacing corresponding to the synchronization signal of the serving cell, and synchronizes with the serving cell.

S403. The UE detects a master information block of the serving cell based on the subcarrier spacing corresponding to the broadcast channel of the serving cell, where the master information block of the serving cell includes subcarrier spacing indication information, and the subcarrier spacing indication information is used to indicate a subcarrier spacing of the serving cell to the UE.

S404. The UE determines the subcarrier spacing of the serving cell based on the subcarrier spacing indication information.

For specific execution processes of S402 to S404, refer to description in another implementation of this application in S203 shown in FIG. 2, and details are not described herein again.

Based on the information communication method provided in this application, when the serving cell uses different system parameters in different services, different deployment scenarios, and different spectrums, the UE may determine a subcarrier spacing currently used by the serving cell, so as to determine, based on the subcarrier spacing, a system parameter currently used by the serving cell, so that the UE may perform information communication with a network device in the serving cell by using the system parameter, thereby improving information communication efficiency.

Figure 5:
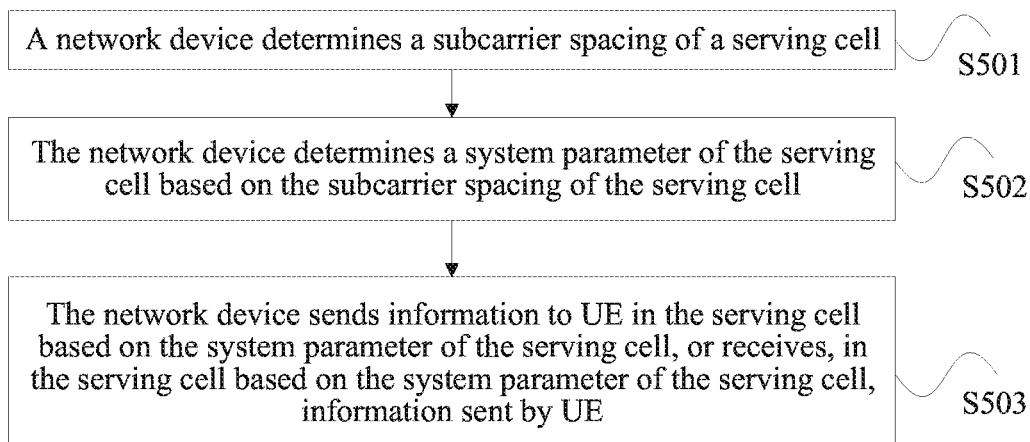
FIG. 5 is a schematic flowchart of still another information communication method according to this application.

FIG. 5 is a schematic flowchart of still another information communication method according to this application. This embodiment relates to a specific process in which a network device determines a system parameter of a serving cell based on a subcarrier spacing of the serving cell. As shown in FIG. 5, the method includes the following steps.

S501. The network device determines a subcarrier spacing of a serving cell.

S502. The network device determines a system parameter of the serving cell based on the subcarrier spacing of the serving cell.

Specifically, for specific execution processes of S501 and S502, refer to description of determining the subcarrier spacing of the serving cell by the UE, and determining, by the UE, the system parameter of the serving cell based on the subcarrier spacing of the serving cell in S101 and S102 shown in FIG. 1. Implementation principles and technical effects thereof are similar, and details are not described herein again in this application.

S503. The network device sends information to UE in the serving cell based on the system parameter of the serving cell, or receives, in the serving cell based on the system parameter of the serving cell, information from UE.

Specifically, after obtaining the system parameter of the serving cell, the network device may perform information communication with the UE in the serving cell by using the system parameter. For example, the network device may send the information to the UE in the serving cell based on the system parameter of the serving cell, and the information may be, for example, downlink data, downlink control information, or a downlink reference signal. The UE may further receive, in the serving cell based on the system parameter of the serving cell, the information from the UE, and the information may be, for example, uplink data or uplink control information.

Based on the information communication method provided in this application, when the serving cell uses different system parameters in different services, different deployment scenarios, and different spectrums, the network device may determine, by using a subcarrier spacing currently used by the serving cell, a system parameter currently used by the serving cell, so that the network device may perform information communication with the UE in the serving cell by using the system parameter, thereby improving information communication efficiency.

Further, based on the foregoing embodiment, this embodiment relates to a specific process in which the network device determines the subcarrier spacing of the serving cell. In this case, S501 may include the following two implementations.

Figure 6:
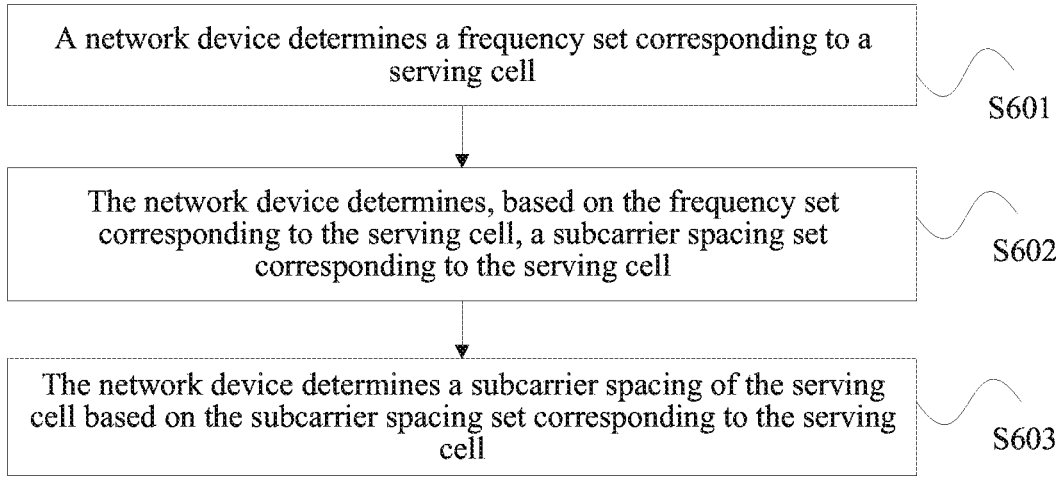
FIG. 6 is a schematic flowchart of still another information communication method according to this application.

In a first implementation, the network device determines the subcarrier spacing of the serving cell based on a frequency set corresponding to the serving cell. FIG. 6 is a schematic flowchart of still another information communication method according to this application. As shown in FIG. 6, the method may include the following steps.

S601. The network device determines a frequency set corresponding to a serving cell.

S602. The network device determines, based on the frequency set corresponding to the serving cell, a subcarrier spacing set corresponding to the serving cell.

For specific execution processes of S601 and S602, refer to description of determining, by the UE, the frequency set corresponding to the serving cell, and determining, by the UE based on the frequency set corresponding to the serving cell, the subcarrier spacing set corresponding to the serving cell in S201 and S202 shown in FIG. 2. Implementation principles and technical effects thereof are similar, and details are not described herein again in this application.

S603. The network device determines a subcarrier spacing of the serving cell based on the subcarrier spacing set corresponding to the serving cell.

Specifically, the network device may determine the subcarrier spacing of the serving cell based on a specific scenario and the subcarrier spacing set corresponding to the serving cell, so that the serving cell may use different subcarrier spacings in different scenarios, thereby improving performance of a communications system by using a subcarrier spacing better matching a scenario. For example, for a large delay spread scenario, a relatively small subcarrier spacing in the subcarrier spacing set may be used. For a high-speed scenario, a relatively large subcarrier spacing in the subcarrier spacing set may be used. An example in which the subcarrier spacing set corresponding to the serving cell includes a subcarrier spacing 15 kHz and a subcarrier spacing 30 kHz when each frequency included in the frequency set corresponding to the serving cell is less than or equal to 6 GHz is used. In this case, for the large delay spread scenario, for example, for a scenario in which a delay spread is approximately up to 5 µs, the subcarrier spacing 15 kHz may be used. For the high-speed scenario, for example, for a high-speed scenario up to 500 km/h, the subcarrier spacing 30 kHz may be used. It should be noted that a manner of obtaining an application scenario by the network device is not limited in this application.

Figure 7:
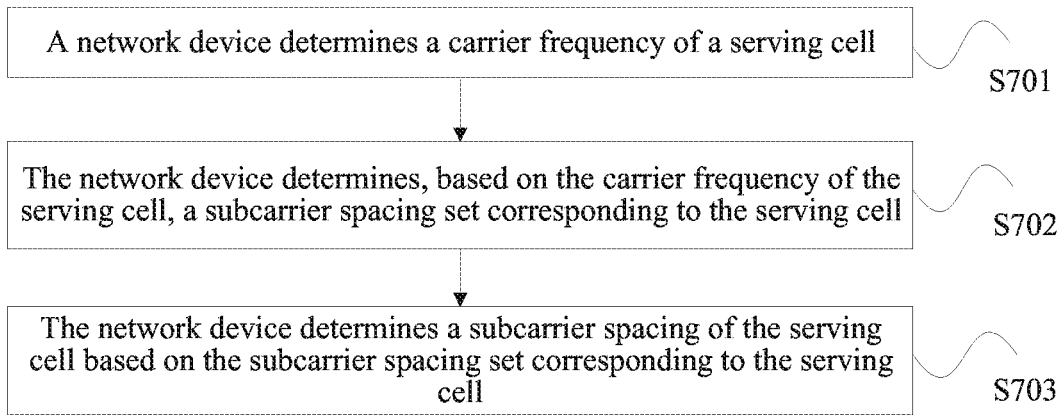
FIG. 7 is a schematic flowchart of still another information communication method according to this application.

In a second implementation, the network device determines the subcarrier spacing of the serving cell based on a carrier frequency of the serving cell. FIG. 7 is a schematic flowchart of still another information communication method according to this application. As shown in FIG. 7, the method may include the following steps.

S701. The network device determines a carrier frequency of a serving cell.

S702. The network device determines, based on the carrier frequency of the serving cell, a subcarrier spacing set corresponding to the serving cell.

For specific execution processes of S701 and S702, refer to description of determining the carrier frequency of the serving cell by the UE, and determining, by the UE based on the carrier frequency of the serving cell, the subcarrier spacing set corresponding to the serving cell in S301 and S302 shown in FIG. 3. Implementation principles and technical effects thereof are similar, and details are not described herein again in this application.

S703. The network device determines a subcarrier spacing of the serving cell based on the subcarrier spacing set corresponding to the serving cell.

For a specific execution process of S703, refer to description of S603 shown in FIG. 6. Implementation principles and technical effects thereof are similar, and details are not described herein again in this application.

Further, based on the foregoing embodiment, this embodiment relates to a specific process in which the network device sends a synchronization signal and a broadcast channel of the serving cell, which may include the following two implementations.

In a first implementation, the network device sends the synchronization signal and the broadcast channel of the serving cell based on the subcarrier spacing set corresponding to the serving cell. FIG. 8 is a schematic flowchart of still another information communication method according to this application. As shown in FIG. 8, after S602 shown in FIG. 6 or S702 shown in FIG. 7, the method may include the following steps.

S801. The network device determines, based on a subcarrier spacing set corresponding to a serving cell, a subcarrier spacing corresponding to a synchronization signal of the serving cell and a subcarrier spacing corresponding to a broadcast channel of the serving cell.

Specifically, the network device may use a specific subcarrier spacing in the subcarrier spacing set corresponding to the serving cell as the subcarrier spacing corresponding to the synchronization signal of the serving cell and the subcarrier spacing corresponding to the broadcast channel of the serving cell. The subcarrier spacing of the serving cell may be the same as or may be different from the subcarrier spacing corresponding to the synchronization signal of the serving cell and the subcarrier spacing corresponding to the broadcast channel of the serving cell. In another implementation of this application, for each subcarrier spacing in the subcarrier spacing set corresponding to the serving cell, the subcarrier spacing corresponding to the synchronization signal of the serving cell and the subcarrier spacing corresponding to the broadcast channel of the serving cell may remain unchanged. For example, the subcarrier spacing corresponding to the synchronization signal of the serving cell and the subcarrier spacing corresponding to the broadcast channel of the serving cell may be the same, and are a largest subcarrier spacing in the subcarrier spacing set corresponding to the serving cell. In this case, for different subcarrier spacings in the subcarrier spacing set corresponding to the serving cell, both the synchronization signal and the broadcast channel are sent by using a same subcarrier spacing, so that the network device can rapidly determine, based on the subcarrier spacing set corresponding to the serving cell, the subcarrier spacing corresponding to the synchronization signal of the serving cell and the subcarrier spacing corresponding to the broadcast channel of the serving cell, and UE accessing the serving cell can determine the subcarrier spacing of the serving cell without blindly detecting the synchronization signal. Therefore, duration in which the UE detects the synchronization signal is shortened. To be specific, duration in which the UE synchronizes with the serving cell is shortened, duration in which the UE accesses the serving cell is shortened, a success rate of detecting the synchronization signal of the serving cell by the UE is increased, and a success rate of accessing a cell by the UE is increased. In addition, the synchronization signal and the broadcast channel can be applicable to different scenarios by using the largest subcarrier spacing, for example, both a high-speed scenario and a low-speed scenario. Therefore, impact of a Doppler frequency can be eliminated.

Further, a cyclic prefix corresponding to the synchronization signal of the serving cell and a cyclic prefix corresponding to the broadcast channel of the serving cell may be greater than a cyclic prefix corresponding to a data channel of the serving cell. The cyclic prefix corresponding to the synchronization signal of the serving cell and the cyclic prefix corresponding to the broadcast channel of the serving cell herein may be a cyclic prefix corresponding to a symbol for transmitting the synchronization signal and a cyclic prefix corresponding to a symbol for transmitting the broadcast channel, and the cyclic prefix corresponding to the data channel may be a cyclic prefix corresponding to a symbol for transmitting data. In this manner, coverage of the synchronization signal and the broadcast channel of the serving cell can be expanded, and robustness of the synchronization signal and the broadcast channel of the serving cell can be improved.

S802. The network device sends the synchronization signal of the serving cell in the serving cell based on the subcarrier spacing corresponding to the synchronization signal of the serving cell, and sends the broadcast channel of the serving cell in the serving cell based on the subcarrier spacing corresponding to the broadcast channel of the serving cell, where a master information block of the serving cell carried on the broadcast channel includes subcarrier spacing indication information, and the subcarrier spacing indication information is used to indicate a subcarrier spacing of the serving cell to UE.

Specifically, the network device sends the synchronization signal and the broadcast channel in the serving cell, so that the UE accessing the serving cell may synchronize with the serving cell based on the synchronization signal, and obtain the subcarrier spacing of the serving cell based on the master information block carried on the broadcast channel, so as to determine a system parameter of the serving cell based on the subcarrier spacing of the serving cell. Therefore, the UE may send or receive information in the serving cell by using the system parameter.

For a specific implementation in which the network device sends the synchronization signal and the broadcast channel of the serving cell, refer to the prior art. For specific description of the broadcast channel, the master information block, and the subcarrier spacing indication information, refer to description in another implementation of this application in S203 shown in FIG. 2, and details are not described herein again.

In a second implementation, the network device sends the synchronization signal and the broadcast channel of the serving cell based on a subcarrier spacing corresponding to a synchronization signal adaptive to all cells and based on a subcarrier spacing corresponding to a broadcast channel adaptive to all cells. FIG. 9 is a schematic flowchart of still another information communication method according to this application. As shown in FIG. 9, the method may include the following steps.

S901. The network device determines a subcarrier spacing corresponding to a synchronization signal of a serving cell and a subcarrier spacing corresponding to a broadcast channel of the serving cell.

Specifically, in this embodiment, all serving cells send the synchronization signal and the broadcast channel by using a same subcarrier spacing. Therefore, the network device can directly use the subcarrier spacing as the subcarrier spacing corresponding to the synchronization signal of the serving cell and the subcarrier spacing corresponding to the broadcast channel of the serving cell.

S902. The network device sends the synchronization signal of the serving cell in the serving cell based on the subcarrier spacing corresponding to the synchronization signal of the serving cell, and sends the broadcast channel of the serving cell in the serving cell based on the subcarrier spacing corresponding to the broadcast channel of the serving cell, where a master information block of the serving cell carried on the broadcast channel includes subcarrier spacing indication information, and the subcarrier spacing indication information is used to indicate a subcarrier spacing of the serving cell to UE.

For a specific execution process of S902, refer to description of S802 shown in FIG. 8. Implementation principles and technical effects thereof are similar, and details are not described herein again in this application.

It should be noted that, in all embodiments of this application, unless specified otherwise, a sequence between the foregoing steps is not limited, and an interdependency between the steps is not limited.

Figure 10:
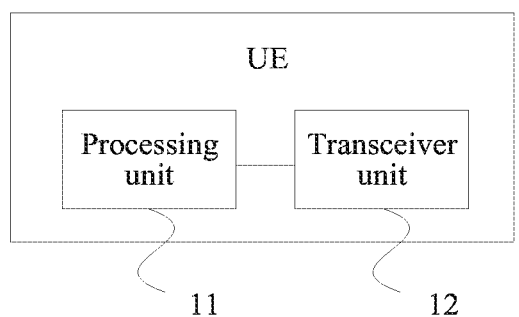
FIG. 10 is a schematic structural diagram of user equipment according to this application.

FIG. 10 is a schematic structural diagram of user equipment according to this application. As shown in FIG. 10, the user equipment UE may include a processing unit 11 and a transceiver unit 12.

The processing unit 11 is configured to: determine a subcarrier spacing of a serving cell; and determine a system parameter of the serving cell based on the subcarrier spacing of the serving cell. The system parameter of the serving cell described herein may include one or more of parameters such as a subframe length, a quantity of symbols included in a subframe, or a cyclic prefix CP length.

The transceiver unit 12 is configured to send information to a network device in the serving cell based on the system parameter of the serving cell determined by the processing unit 11, or receive, in the serving cell based on the system parameter of the serving cell determined by the processing unit 11, information from a network device.

The processing unit 11 and the transceiver unit 12 may be implemented by using software, or may be implemented by using hardware, or may be implemented in a combination of hardware and software. During specific implementation, the processing unit 11 may be a processor of the UE, and the transceiver unit 12 may be a transceiver or the like of the UE.

The UE provided in this application can perform the foregoing method embodiments. Implementation principles and technical effects thereof are similar, and details are not described herein again.

Optionally, that the processing unit 11 is configured to determine a subcarrier spacing of a serving cell may be:

The processing unit 11 is configured to: determine a frequency set corresponding to the serving cell; determine, based on the frequency set corresponding to the serving cell, a subcarrier spacing set corresponding to the serving cell;

and determine the subcarrier spacing of the serving cell based on the subcarrier spacing set corresponding to the serving cell.

Alternatively, the processing unit 11 is configured to: determine a carrier frequency of the serving cell; determine, based on the carrier frequency of the serving cell, a subcarrier spacing set corresponding to the serving cell; and determine the subcarrier spacing of the serving cell based on the subcarrier spacing set corresponding to the serving cell.

That the processing unit 11 is configured to determine, based on the carrier frequency of the serving cell, a subcarrier spacing set corresponding to the serving cell may be:

The processing unit 11 is configured to: when the carrier frequency of the serving cell is less than or equal to 6 GHz, determine that the subcarrier spacing set corresponding to the serving cell includes a subcarrier spacing 15 kHz and a subcarrier spacing 30 kHz; or when the carrier frequency of the serving cell is greater than 6 GHz and less than or equal to 30 GHz, determine that the subcarrier spacing set corresponding to the serving cell includes a subcarrier spacing 30 kHz and a subcarrier spacing 60 kHz; or when the carrier frequency of the serving cell is greater than 30 GHz and less than or equal to 100 GHz, determine that the subcarrier spacing set corresponding to the serving cell includes a subcarrier spacing 120 kHz and a subcarrier spacing 240 kHz.

Alternatively, the processing unit 11 is configured to: when the carrier frequency of the serving cell is less than or equal to 3 GHz, determine that the subcarrier spacing set corresponding to the serving cell includes a subcarrier spacing 15 kHz and a subcarrier spacing 17.5 kHz; or when the carrier frequency of the serving cell is greater than 3 GHz and less than or equal to 6 GHz, determine that the subcarrier spacing set corresponding to the serving cell includes a subcarrier spacing 17.5 kHz and a subcarrier spacing 35 kHz; or when the carrier frequency of the serving cell is greater than 6 GHz and less than or equal to 30 GHz, determine that the subcarrier spacing set corresponding to the serving cell includes a subcarrier spacing 35 kHz and a subcarrier spacing 70 kHz; or when the carrier frequency of the serving cell is greater than 30 GHz and less than or equal to 100 GHz, determine that the subcarrier spacing set corresponding to the serving cell includes a subcarrier spacing 140 kHz and a subcarrier spacing 280 kHz.

Optionally, when the subcarrier spacing set corresponding to the serving cell includes one or two subcarrier spacings, that the processing unit 11 is configured to determine the subcarrier spacing of the serving cell based on the subcarrier spacing set corresponding to the serving cell may be:

The processing unit 11 is configured to: detect, by using the transceiver unit 12, a synchronization signal of the serving cell based on the subcarrier spacing set corresponding to the serving cell; and determine the subcarrier spacing of the serving cell based on the detected synchronization signal of the serving cell.

Optionally, when the subcarrier spacing set corresponding to the serving cell includes more than two subcarrier spacings, that the processing unit is configured to determine the subcarrier spacing of the serving cell based on the subcarrier spacing set corresponding to the serving cell may be:

The processing unit 11 is configured to: determine, based on the subcarrier spacing set corresponding to the serving cell, a subcarrier spacing corresponding to a synchronization signal of the serving cell and a subcarrier spacing corresponding to a broadcast channel of the serving cell; detect, by using the transceiver unit 12, the synchronization signal of the serving cell based on the subcarrier spacing corresponding to the synchronization signal of the serving cell, and synchronize with the serving cell by using the transceiver unit 12; detect, by using the transceiver unit 12, a master information block of the serving cell based on the subcarrier spacing corresponding to the broadcast channel of the serving cell, where the master information block includes subcarrier spacing indication information, and the subcarrier spacing indication information is used to indicate the subcarrier spacing of the serving cell to the UE; and determine the subcarrier spacing of the serving cell based on the subcarrier spacing indication information.

The subcarrier spacing corresponding to the synchronization signal of the serving cell and the subcarrier spacing corresponding to the broadcast channel of the serving cell may be any subcarrier spacing in the subcarrier spacing set corresponding to the serving cell. For example, the subcarrier spacing corresponding to the synchronization signal of the serving cell and the subcarrier spacing corresponding to the broadcast channel of the serving cell may be the same, and may be a largest subcarrier spacing in the subcarrier spacing set corresponding to the serving cell. Both a cyclic prefix corresponding to the synchronization signal of the serving cell and a cyclic prefix corresponding to the broadcast channel of the serving cell may be greater than a cyclic prefix corresponding to a data channel of the serving cell.

Optionally, when all serving cells send the synchronization signal and the broadcast channel by using a same subcarrier spacing, that the processing unit 11 is configured to determine a subcarrier spacing of a serving cell may be:

The processing unit 11 is configured to: determine a subcarrier spacing corresponding to a synchronization signal of the serving cell and a subcarrier spacing corresponding to a broadcast channel of the serving cell; detect, by using the transceiver unit 12, the synchronization signal of the serving cell based on the subcarrier spacing corresponding to the synchronization signal of the serving cell, and synchronize with the serving cell by using the transceiver unit 12; detect, by using the transceiver unit 12, a master information block of the serving cell based on the subcarrier spacing corresponding to the broadcast channel of the serving cell, where the master information block of the serving cell includes subcarrier spacing indication information, and the subcarrier spacing indication information is used to indicate the subcarrier spacing of the serving cell to the UE; and determine the subcarrier spacing of the serving cell based on the subcarrier spacing indication information.

Both a cyclic prefix corresponding to the synchronization signal of the serving cell and a cyclic prefix corresponding to the broadcast channel of the serving cell may be greater than a cyclic prefix corresponding to a data channel of the serving cell.

The UE provided in this application can execute the foregoing method embodiments. Implementation principles and technical effects thereof are similar, and details are not described herein again.

Figure 11:
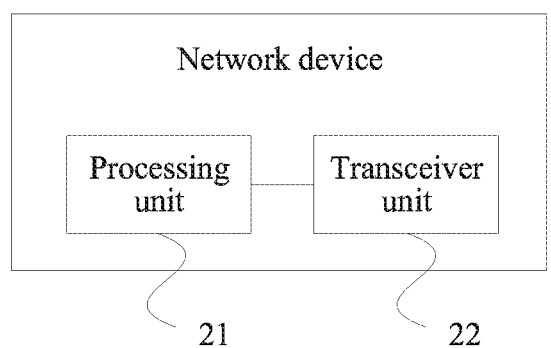
FIG. 11 is a schematic structural diagram of a network device according to this application.

FIG. 11 is a schematic structural diagram of a network device according to this application. As shown in FIG. 11, the network device may include a processing unit 21 and a transceiver unit 22.

The processing unit 21 is configured to: determine a subcarrier spacing of a serving cell; and determine a system parameter of the serving cell based on the subcarrier spacing of the serving cell. The system parameter of the serving cell described herein may include one or more of parameters such as a subframe length, a quantity of symbols included in a subframe, or a cyclic prefix CP length.

The transceiver unit 22 is configured to send information to UE in the serving cell based on the system parameter of the serving cell determined by the processing unit 21, or receive, in the serving cell based on the system parameter of the serving cell determined by the processing unit 21, information from UE.

The processing unit 21 and the transceiver unit 22 may be implemented by using software, or may be implemented by using hardware, or may be implemented in a combination of hardware and software. During specific implementation, the processing unit 21 may be a processor of the network device, and the transceiver unit 22 may be a transceiver or the like of the network device.

The network device provided in this application can execute the foregoing method embodiments. Implementation principles and technical effects thereof are similar, and details are not described herein again.

Optionally, that the processing unit 21 is configured to determine a subcarrier spacing of a serving cell may be:

The processing unit 21 is configured to: determine a frequency set corresponding to the serving cell; determine, based on the frequency set corresponding to the serving cell, a subcarrier spacing set corresponding to the serving cell; and determine the subcarrier spacing of the serving cell based on the subcarrier spacing set corresponding to the serving cell.

Alternatively, the processing unit 21 is configured to: determine a carrier frequency of the serving cell; determine, based on the carrier frequency of the serving cell, a subcarrier spacing set corresponding to the serving cell; and determine the subcarrier spacing of the serving cell based on the subcarrier spacing set corresponding to the serving cell.

That the processing unit 21 is configured to determine, based on the carrier frequency of the serving cell, a subcarrier spacing set corresponding to the serving cell may be:

The processing unit 21 is configured to: when the carrier frequency of the serving cell is less than or equal to 6 GHz, determine that the subcarrier spacing set corresponding to the serving cell includes a subcarrier spacing 15 kHz and a subcarrier spacing 30 kHz; or when the carrier frequency of the serving cell is greater than 6 GHz and less than or equal to 30 GHz, determine that the subcarrier spacing set corresponding to the serving cell includes a subcarrier spacing 30 kHz and a subcarrier spacing 60 kHz; or when the carrier frequency of the serving cell is greater than 30 GHz and less than or equal to 100 GHz, determine that the subcarrier spacing set corresponding to the serving cell includes a subcarrier spacing 120 kHz and a subcarrier spacing 240 kHz.

Alternatively, the processing unit 21 is configured to: when the carrier frequency of the serving cell is less than or equal to 3 GHz, determine that the subcarrier spacing set corresponding to the serving cell includes a subcarrier spacing 15 kHz and a subcarrier spacing 17.5 kHz; or when the carrier frequency of the serving cell is greater than 3 GHz and less than or equal to 6 GHz, determine that the subcarrier spacing set corresponding to the serving cell includes a subcarrier spacing 17.5 kHz and a subcarrier spacing 35 kHz; or when the carrier frequency of the serving cell is greater than 6 GHz and less than or equal to 30 GHz, determine that the subcarrier spacing set corresponding to the serving cell includes a subcarrier spacing 35 kHz and a subcarrier spacing 70 kHz; or when the carrier frequency of the serving cell is greater than 30 GHz and less than or equal to 100 GHz, determine that the subcarrier spacing set corresponding to the serving cell includes a subcarrier spacing 140 kHz and a subcarrier spacing 280 kHz.

Further, based on the foregoing embodiment, the processing unit 21 is further configured to determine, based on the subcarrier spacing set corresponding to the serving cell, a subcarrier spacing corresponding to a synchronization signal of the serving cell and a subcarrier spacing corresponding to a broadcast channel of the serving cell.

In this case, the transceiver unit 22 is further configured to: send the synchronization signal of the serving cell in the serving cell based on the subcarrier spacing that is determined by the processing unit 21 and that corresponds to the synchronization signal of the serving cell, and send the broadcast channel of the serving cell in the serving cell based on the subcarrier spacing that is determined by the processing unit 21 and that corresponds to the broadcast channel of the serving cell, where a master information block of the serving cell carried on the broadcast channel includes subcarrier spacing indication information, and the subcarrier spacing indication information is used to indicate the subcarrier spacing of the serving cell to the UE.

The subcarrier spacing corresponding to the synchronization signal of the serving cell and the subcarrier spacing corresponding to the broadcast channel of the serving cell may be any subcarrier spacing in the subcarrier spacing set corresponding to the serving cell. For example, the subcarrier spacing corresponding to the synchronization signal of the serving cell and the subcarrier spacing corresponding to the broadcast channel of the serving cell may be the same, and may be a largest subcarrier spacing in the subcarrier spacing set corresponding to the serving cell. Both a cyclic prefix corresponding to the synchronization signal of the serving cell and a cyclic prefix corresponding to the broadcast channel of the serving cell may be greater than a cyclic prefix corresponding to a data channel of the serving cell.

Optionally, when all serving cells send the synchronization signal and the broadcast channel by using a same subcarrier spacing, the processing unit 21 is further configured to determine the subcarrier spacing corresponding to the synchronization signal of the serving cell and the subcarrier spacing corresponding to the broadcast channel of the serving cell.

In this case, the transceiver unit 22 is further configured to: send the synchronization signal of the serving cell in the serving cell based on the subcarrier spacing that is determined by the processing unit 21 and that corresponds to the synchronization signal of the serving cell, and send the broadcast channel of the serving cell in the serving cell based on the subcarrier spacing that is determined by the processing unit 21 and that corresponds to the broadcast channel of the serving cell, where a master information block of the serving cell carried on the broadcast channel includes subcarrier spacing indication information, and the subcarrier spacing indication information is used to indicate the subcarrier spacing of the serving cell to the UE.

Both a cyclic prefix corresponding to the synchronization signal of the serving cell and a cyclic prefix corresponding to the broadcast channel of the serving cell may be greater than a cyclic prefix corresponding to a data channel of the serving cell.

The network device provided in this application can perform the foregoing method embodiments. Implementation principles and technical effects thereof are similar, and details are not described herein again.

What is claimed is:

1. A method for wireless communication, comprising:
   determining a frequency set of a serving cell, wherein the frequency set of the serving cell is one of a plurality of frequency sets, each frequency set of the plurality of frequency sets representing a range of carrier frequencies and being associated with one or more subcarrier spacings;
determining at least one subcarrier spacing associated with the frequency set of the serving cell; and
receiving a synchronization signal based on the at least one subcarrier spacing associated with the frequency set of the serving cell.

2. The method according to claim 1, comprising:
determining a carrier frequency of the serving cell, the carrier frequency belonging to the frequency set of the serving cell.

3. The method according to claim 1, wherein determining the at least one subcarrier spacing associated with the frequency set of the serving cell comprises:
determining a subcarrier spacing corresponding to a synchronization signal.

4. The method according to claim 1, further comprising:
receiving a master information block (MIB) that includes subcarrier spacing indication information; and
determining a subcarrier spacing of the serving cell based on the subcarrier spacing indication information included in the MIB.

5. The method according to claim 4, wherein receiving a master information block (MIB) comprises:
receiving the MIB in a broadcast channel based on a subcarrier spacing corresponding to the broadcast channel.

6. The method according to claim 5, wherein the subcarrier spacing corresponding to the synchronization signal is same as the subcarrier spacing corresponding to the broadcast channel.

7. The method according to claim 4, further comprising:
determining a system parameter of the serving cell based on the subcarrier spacing of the serving cell; and
sending information to a network device in the serving cell based on the system parameter of the serving cell, or receiving information from a network device in the serving cell based on the system parameter of the serving cell.

8. The method according to claim 7, wherein the system parameter of the serving cell comprises one or more of following parameters: a subframe length, a quantity of symbols comprised in a subframe, or a cyclic prefix CP length.

9. The method according to claim 1, wherein when the frequency set is the frequency set with carrier frequency less than or equal to 6 GHz, the at least one subcarrier spacing comprises at least one of 1.5 kHz or 30 kHz.

10. The method according to claim 1, wherein when the frequency set is the frequency set with carrier frequency larger than 6 GHz, the at least one subcarrier spacing comprises at least one of 60 kHz, 120 kHz, 240 kHz.

11. The method according to claim 1, wherein the plurality of frequency sets comprises one or more of the following:
frequency set with carrier frequency less than or equal to 3 GHz,
frequency set with carrier frequency larger than 3 GHz and less than or equal to 6 GHz,
frequency set with carrier frequency less than or equal to 6 GHz,
frequency set with carrier frequency larger than 6 GHz,
frequency set with carrier frequency larger than 6 GHz and less than or equal to 30 GHz,
frequency set with carrier frequency larger than 30 GHz,
frequency set with carrier frequency larger than 30 GHz and less than or equal to 100 GHz,
frequency set with carrier frequency larger than 6 GHz and less than or equal to 40 GHz,
frequency set with carrier frequency larger than 40 GHz,
frequency set with carrier frequency larger than 40 GHz and less than or equal to 80 GHz, or
frequency set with carrier frequency larger than 80 GHz.

12. An apparatus for a wireless communication system, comprising:
at least one processor; and
a non-transitory computer readable storage medium storing programming for execution by the at least one processor, the programming including instructions to:
determine a frequency set of a serving cell, wherein the frequency set of the serving cell is one of a plurality of frequency sets, each frequency set of the plurality of frequency sets representing a range of carrier frequencies and being associated with one or more subcarrier spacings;
determine at least one subcarrier spacing associated with the frequency set of the serving cell; and
receive a synchronization signal based on the at least one subcarrier spacing associated with the frequency set of the serving cell.

13. The apparatus according to claim 12, wherein the programming further includes instructions to:
determine a carrier frequency of the serving cell, the carrier frequency belonging to the frequency set of the serving cell.

14. The apparatus according to claim 12, wherein the instructions to determine the at least one subcarrier spacing associated with the frequency set of the serving cell include instructions to:
determine a subcarrier spacing corresponding to a synchronization signal.

15. The apparatus according to claim 12, wherein the programming further includes instructions to:
receive a master information block (MIB) that includes subcarrier spacing indication information; and
determine a subcarrier spacing of the serving cell based on the subcarrier spacing indication information included in the MIB.

16. The apparatus according to claim 15, wherein the instructions to receive the MIB include instructions to:
receive the MIB in a broadcast channel based on a subcarrier spacing corresponding to the broadcast channel.

17. The apparatus according to claim 16, wherein the subcarrier spacing corresponding to the synchronization signal is same as the subcarrier spacing corresponding to the broadcast channel.

18. The apparatus according to claim 12, wherein the programming further includes instructions to:
determine a system parameter of the serving cell based on the subcarrier spacing of the serving cell; and
send information to a network device in the serving cell based on the system parameter of the serving cell, or receive information from a network device in the serving cell based on the system parameter of the serving cell.

19. The apparatus according to claim 12, wherein if the frequency set of the serving cell is the frequency set with carrier frequency less than or equal to 6 GHz, the at least one subcarrier spacing associated with the frequency set comprising at least one of 15 kHz or 30 kHz.

20. The apparatus according to claim 12, wherein if the frequency set of the serving cell is the frequency set with carrier frequency larger than 6 GHz, the at least one subcarrier spacing associated with the frequency set comprising at least one of 60 kHz, 120 kHz, 240 kHz.

\* \* \* \* \*

UNITED STATES PATENT AND TRADEMARK OFFICE
CERTIFICATE OF CORRECTION

PATENT NO. : 10,554,321 B2
APPLICATION NO. : 16/146602
DATED : February 4, 2020
INVENTOR(S) : Yan Cheng Page 1 of 1

It is certified that error appears in the above-identified patent and that said Letters Patent is hereby corrected as shown below:

In the Claims

In Column 35, Line 49, Claim 9, delete "1.5kHz" and insert --15kHz--.

Signed and Sealed this
Tenth Day of September, 2024

Katherine Kelly Vidal
*Director of the United States Patent and Trademark Office*